(12) United States Patent
Ebihara et al.

(10) Patent No.: US 10,819,936 B2
(45) Date of Patent: Oct. 27, 2020

(54) BIAS CIRCUIT FOR USE WITH DIVIDED BIT LINES

(71) Applicant: OmniVision Technologies, Inc., Santa Clara, CA (US)

(72) Inventors: Hiroaki Ebihara, San Jose, CA (US); Zheng Yang, San Jose, CA (US); Rui Wang, San Jose, CA (US); Teijun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/275,092

(22) Filed: Feb. 13, 2019

(65) Prior Publication Data

US 2020/0260031 A1    Aug. 13, 2020

(51) Int. Cl.
*H04N 5/378* (2011.01)
*H04N 5/3745* (2011.01)
*H04N 5/374* (2011.01)
*H04N 5/369* (2011.01)

(52) U.S. Cl.
CPC ............. *H04N 5/378* (2013.01); *H04N 5/379* (2018.08); *H04N 5/3742* (2013.01); *H04N 5/37455* (2013.01)

(58) Field of Classification Search
CPC ...... H04N 5/378; H04N 5/3742; H04N 5/379; H04N 5/37455
See application file for complete search history.

(56) References Cited

U.S. PATENT DOCUMENTS

| 4,996,413 A * | 2/1991 | McDaniel ............... H04N 5/374 250/208.1 |
| 9,609,213 B2 | 3/2017 | Wakabayashi |
| 10,021,330 B2 * | 7/2018 | Kubo ................. H04N 5/37457 |
| 2002/0154231 A1 * | 10/2002 | Decker .................. H04N 5/343 348/302 |
| 2004/0252213 A1 * | 12/2004 | Itoh ...................... H04N 5/3653 348/308 |
| 2005/0151058 A1 * | 7/2005 | Ang .................... H04N 5/23241 250/208.1 |
| 2005/0237408 A1 * | 10/2005 | Muramatsu .............. H04N 3/15 348/308 |
| 2010/0097510 A1 * | 4/2010 | Wada ................... H04N 5/3742 348/308 |
| 2012/0013780 A1 * | 1/2012 | Mo ........................ H04N 5/347 348/308 |

(Continued)

Primary Examiner — Timothy J Henn
(74) *Attorney, Agent, or Firm* — Christensen O'Connor Johnson Kindness PLLC

(57) ABSTRACT

An image sensor includes a pixel array including a plurality of pixels. Each pixel is coupled to generate image data in response to incident light. A bit line is coupled to a column of pixels of the pixel array and is separated into first and second portions. Each portion is coupled to a corresponding portion of rows of pixels of the pixel array. A readout circuit coupled to the bit line to read out the image data from the pixel array. The readout circuit includes a cascode device coupled between the first and second portions of the bit line. The cascode device is coupled to be biased to electrically separate the first and second portions of the bit line from one another such that a capacitance of each portion of the bit line does not affect a settling time of an other portion of the bit line.

41 Claims, 13 Drawing Sheets

(56) References Cited

U.S. PATENT DOCUMENTS

| | | | | |
|---|---|---|---|---|
| 2012/0119065 | A1* | 5/2012 | Cieslinski | H04N 5/3658 250/208.1 |
| 2013/0146749 | A1* | 6/2013 | Cieslinski | H04N 5/378 250/208.1 |
| 2013/0182163 | A1* | 7/2013 | Kobayashi | H01L 27/14601 348/302 |
| 2014/0145067 | A1* | 5/2014 | Suh | H04N 5/3742 250/208.1 |
| 2014/0333815 | A1* | 11/2014 | Iwane | H04N 5/369 348/308 |
| 2016/0156861 | A1* | 6/2016 | Kitani | H04N 5/374 348/308 |
| 2016/0198109 | A1* | 7/2016 | Ishii | H04N 5/347 348/302 |
| 2016/0293648 | A1* | 10/2016 | Soda | H01L 27/14612 |
| 2016/0360138 | A1* | 12/2016 | Meynants | H01L 27/14609 |
| 2017/0332026 | A1* | 11/2017 | Matsumoto | H04N 5/378 |
| 2018/0191981 | A1* | 7/2018 | Tanaka | H04N 5/378 |
| 2019/0268555 | A1* | 8/2019 | Ebihara | H01L 27/14634 |
| 2019/0268556 | A1* | 8/2019 | Ebihara | H01L 27/14634 |
| 2019/0297293 | A1* | 9/2019 | Matsumoto | H04N 5/3575 |
| 2019/0373196 | A1* | 12/2019 | Park | H04N 5/3698 |
| 2020/0058690 | A1* | 2/2020 | Kim | H01L 27/14603 |

* cited by examiner

BIAS CIRCUIT FOR USE WITH DIVIDED BIT LINES

BACKGROUND INFORMATION

Field of the Disclosure

This disclosure relates generally to bit lines, and in particular but not exclusively, relates to bit lines for use with image sensors.

Background

Image sensors have become ubiquitous. They are widely used in digital still cameras, cellular phones, security cameras, as well as, medical, automobile, and other applications. The technology used to manufacture image sensors, and in particular, complementary metal-oxide-semiconductor (CMOS) image sensors (CIS), has continued to advance at a great pace. For example, the demands for higher resolution and lower power consumption have encouraged the further miniaturization and integration of these image sensors.

The pixels included in image sensors include photodiodes that generate image charge in response to light that is incident upon the image sensor. The image charge is transferred from the photodiodes through transfer transistors to floating diffusions in order to capture image data. The image data in the floating diffusions is amplified and read out through bit lines in order to read out the image data from the image sensor. The frame rate for reading out images from in an image sensor is limited by the bit line settling time.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
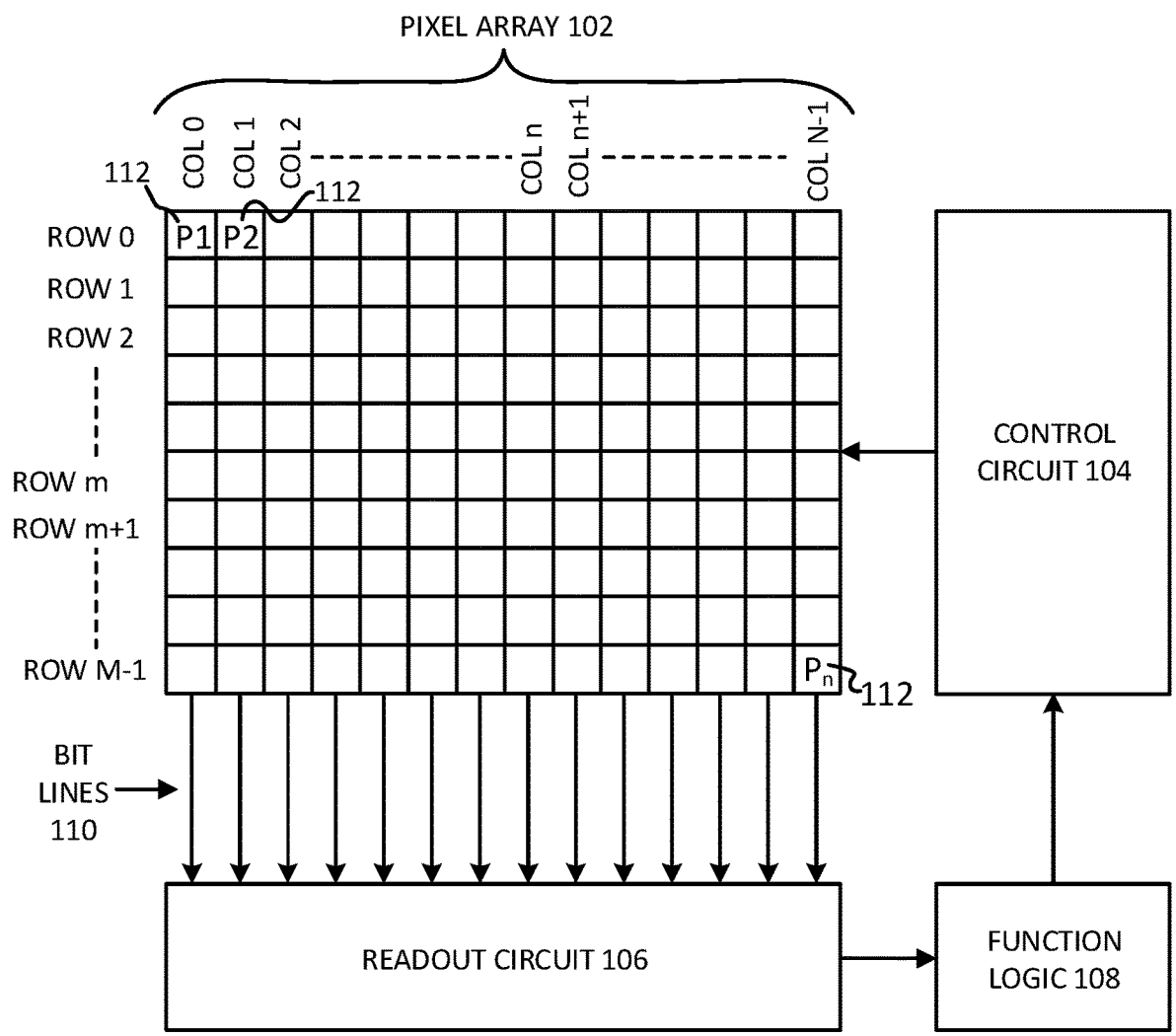
FIG. 1 illustrates one example of an imaging system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for dividing bit lines in an imaging circuit are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

The frame rate of image sensor is limited by the bit line settling time. The bit line settling time can be shortened by reducing the capacitance of the bit line. As will be discussed, in various examples, the bit lines are divided into separate portions that are electrically separated from one another such that the capacitance of each portion of the bit lines does not affect the other portions of the bit lines in accordance with the teachings of the present disclosure. Thus, by dividing the bit lines into smaller separate portions, the capacitance on each divided bit line is reduced. As will be shown, in one example, column bit lines are divided or segmented into separate portions at or near the middle to form a "top" bit line portion and a "bottom" bit line portion for each column, each of which are coupled to single readout circuit through hybrid bonds between wafers in a stacked chip scheme. In this way, the lengths of the separate bit line portions are shorter, and the capacitance of each separate bit line portion can therefore be reduced so that bit line settling time can be reduced. As a result, the frame rate of the CMOS image sensor (CIS) is improved in accordance with the teachings of the present invention.

To illustrate, FIG. 1 illustrates one example of an imaging system 100 in accordance with an embodiment of the present disclosure. Imaging system 100 includes pixel array 102, control circuit 104, readout circuit 106, and function logic 108. In one example, pixel array 102 is a two-dimensional (2D) array of photodiodes, or image sensor pixels 112 (e.g., P1, P2, . . . , Pn). As illustrated, photodiodes 112 are arranged into rows (e.g., rows Row 0 to Row M−1) and columns (e.g., column Col 0 to Col N−1) to acquire image data of a person, place, object, etc., which can then be used to render a 2D image of the person, place, object, etc. However, photodiodes 112 do not have to be arranged into rows and columns and may take other configurations.

In one example, after each image sensor photodiode/pixel 112 in pixel array 102 has acquired its image charge through photo-generation of the image charge, corresponding image data is read out by a readout circuit through bit lines 110 and then transferred to function logic. Readout circuit 106 may be coupled to read out image data from the plurality of photodiodes 112 in pixel array 102. In various examples, the readout circuit 106 may include amplification circuit, analog-to-digital (ADC) conversion circuit, or otherwise. In one example, the readout circuit 106 may read out a row of image data at a time along bit lines 110 as illustrated in FIG. 1. The function logic 108 may store the image data or even manipulate the image data by applying post image effects (e.g., crop, rotate, remove red eye, adjust brightness, adjust contrast, or otherwise).

Figure 2:
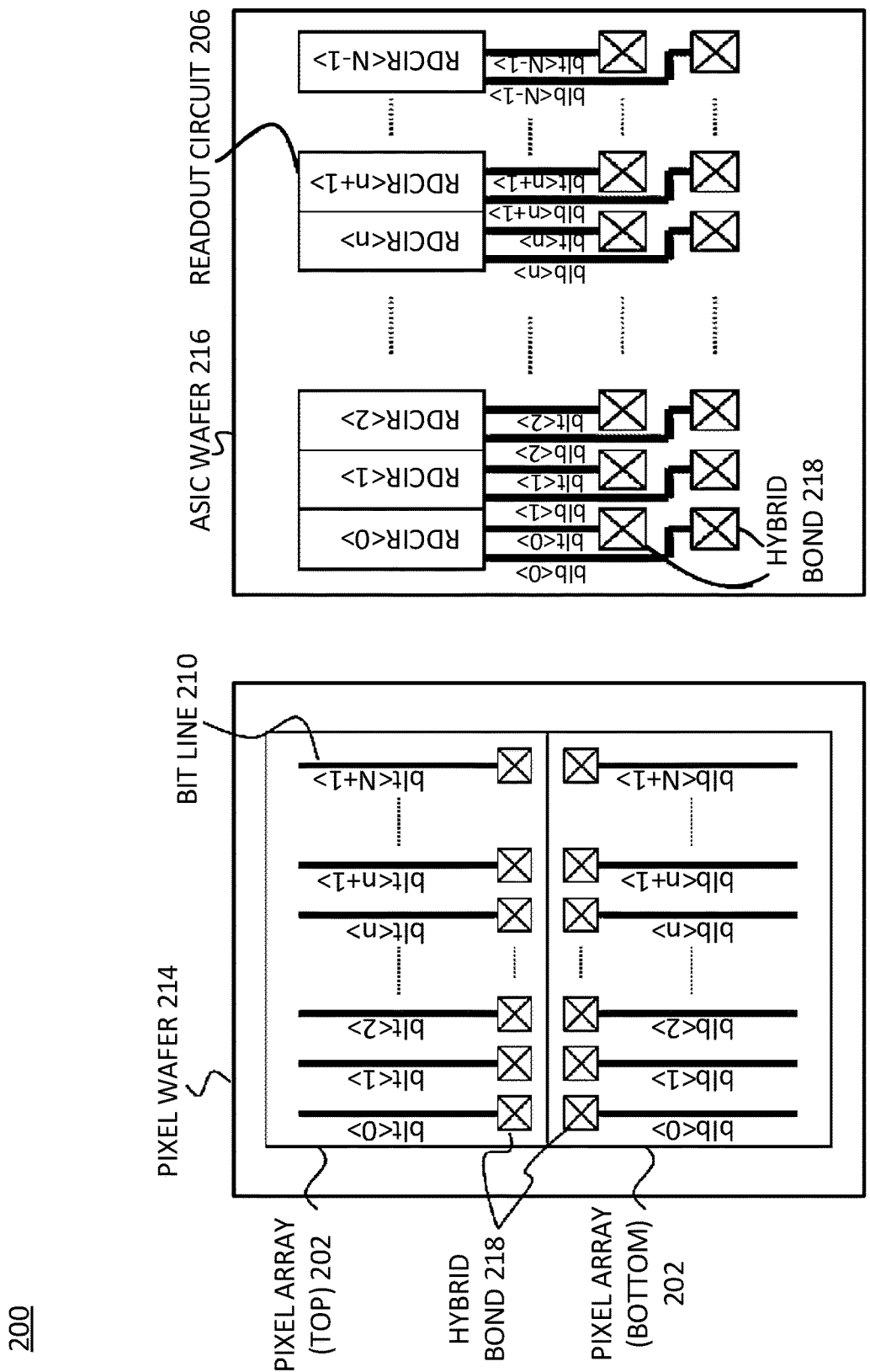
FIG. 2 shows an example of stacked sensors implemented with a pixel wafer and an ASIC wafer in accordance with the teachings of the present invention.

FIG. 2 shows an example of stacked sensors 200 implemented with a pixel wafer 214 and an application specific integrated circuit (ASIC) wafer 216 in accordance with an embodiment of the present disclosure. It is noted that stacked sensors 200 of FIG. 2 may be an example implementation of imaging system 100 of FIG. 1, and that similarly named and numbered elements referenced below are coupled and function similar to as described above. In the example, the pixel wafer 214 includes a pixel array 202 and bit lines 210, and the ASIC wafer 216 includes readout circuits 206, which are coupled to bit lines 210 to read out signals from the pixel array 202. In the example, the bit lines 210 pass signals from the pixel array 202 to the readout circuits 206 on the ASIC wafer 216 through hybrid bonds 218. Instead of one bit line 210 in each readout column, examples in accordance with the teachings of the present invention include a bit line 210 for each column, which is segmented or divided at or near the middle into two divided bit lines that are electrically separated from one another: a top bit line (e.g., blt<0>, blt<1>, . . . , blt<N−1>) and a bottom bit line (e.g., blb<0>, blb<1>, . . . , blb<N−1>). With the electrical separation of the divided bit lines, the capacitance of each top bit line does not affect each bottom bit line, and vice versa. In one example, each divided bit line 210 in the pixel wafer 214 is coupled to its own designated readout circuit 206 (e.g., RDCIR<0>, RDCIR<1>, . . . , RDCIR<N−1>) in the ASIC wafer 216, which is interconnected to the pixel wafer 214 through hybrid bonds 218.

Figure 3:
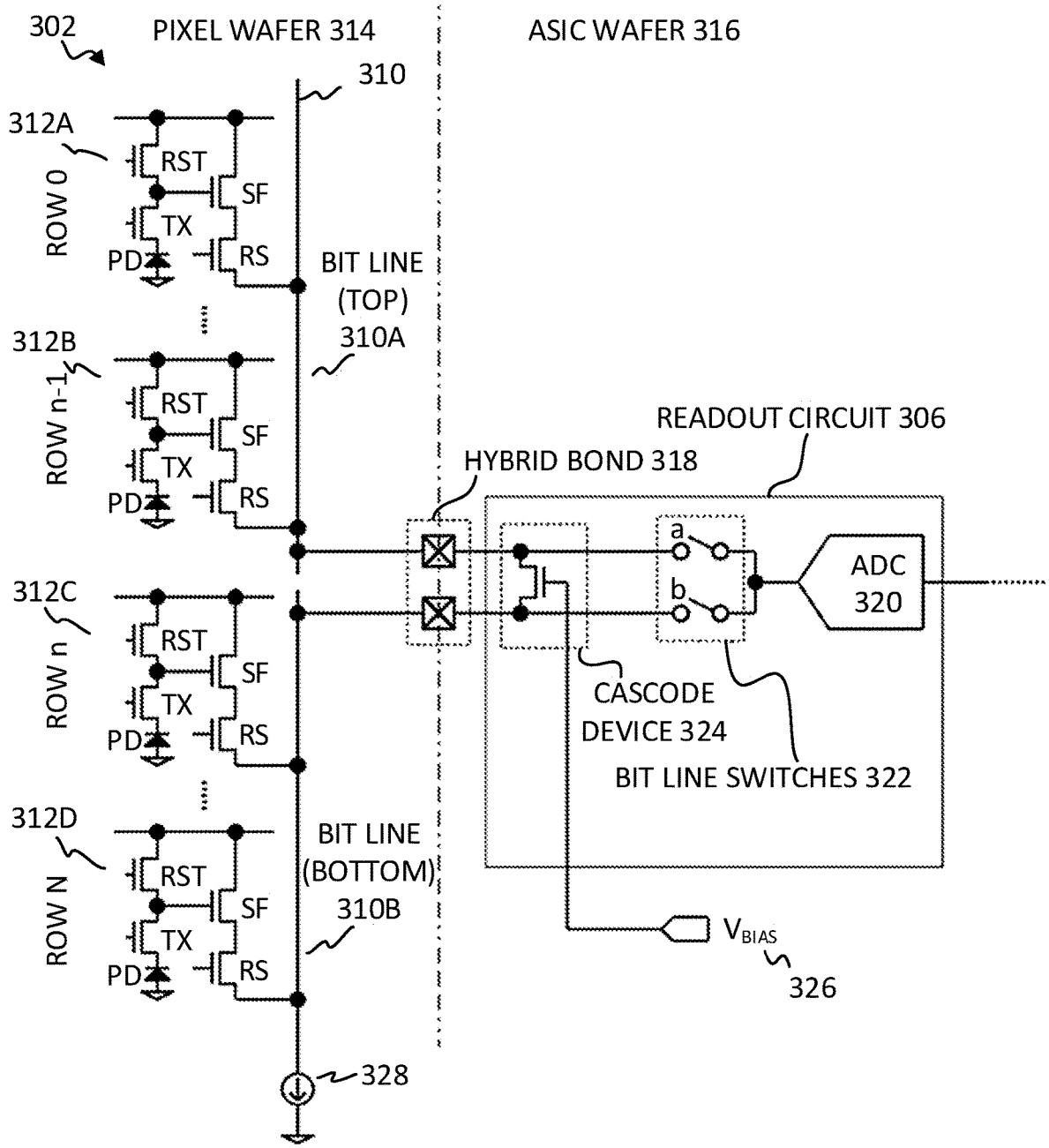
FIG. 3 is a diagram illustrating one example of stacked sensors including a readout circuit including a cascode device coupled to read out image data from a pixel array through divided bit lines in an imaging system in accordance with the teachings of the present invention.

FIG. 3 shows an example of stacked sensors 300 implemented with a pixel wafer 314 including a plurality of pixels 312A-312D of a pixel array 302, and an ASIC wafer 316 including readout circuits 306 in accordance with the teachings of the present invention. It is noted that stacked sensors 300 of FIG. 3 may be an example of stacked sensor 200 of FIG. 2 or imaging system 100 of FIG. 1, and that similarly named and numbered elements referenced below are coupled and function similar to as described above. In the depicted example, pixels 312A-312D are illustrated as 4T pixel implementations, each of which includes a photodiode (PD), a reset transistor (RST), a transfer transistor (TX), a source follower transistor (SF), and a row select transistor (RS) coupled to the bit line 310 as shown. It is appreciated that in other examples, other pixel implementations (e.g., 3T, etc.) may also be contemplated in accordance with the teachings of the present invention. In the example, pixel 312A is in Row 0, pixel 312B is in Row n−1, pixel 312C is in Row n, and pixel 312D is in Row N of the pixel array 302.

The readout circuit 306 illustrated in FIG. 3 includes cascode device 324, bit line switches 322, and an analog-to-digital converter (ADC) 320. In the depicted example, a bit line current source 328 is coupled to the bottom bit line 310B of bit line 310 on the bottom of pixel array 302 to draw a bit line bias current. It is appreciated that although the bit line current source 328 example is illustrated in FIG. 3 as being on the pixel wafer 314, the bit line current source 328 may also be on the ASIC wafer 316 in another example in accordance with the teachings of the present invention.

As shown in the depicted example, the bit line 310 is divided or separated into a top bit line 310A and a bottom bit line 310B, and are electrically separated from one another in pixel wafer 314 so the capacitance on the bottom bit line 310B does not affect the settling time of the top bit line 310A, and vice versa. Top bit line 310A and bottom bit line 310B are coupled to hybrid bonds 318, which are coupled to the ADC 310 through the bit line switches 322 in the ASIC wafer 316. In the depicted example, bit line switches 322 are included in a switching circuit configured to couple top bit line 310A through switch "a" of bit line switches 322 to ADC 310, and bottom bit line 310B is coupled through switch "b" of bit line switches 322 to ADC.

To read out signals from a pixel (e.g., 312A-B) coupled to the top bit line 310A, the switch "a" of bit line switches 322 in FIG. 3 is turned on and the switch "b" of bit line switches 322 is turned off so that the top bit line 310A is coupled to the ADC 320 and bottom bit line 310B is not coupled to the ADC 320. At the same time, an intermediate voltage is supplied to Vbias 326, which causes the cascode device 324 coupled between the top bit line 310A and the bottom bit line 310B through hybrid bonds 318 to operate in the saturation region. In this way, the top bit line 310A and the bottom bit line 310B remain electrically separated from one another so the capacitance on the bottom bit line 310B does not affect the settling time of top bit line 310A in accordance with the teachings of the present invention.

To read out signals from a pixel (e.g., 312C-D) coupled to the bottom bit line 310B, the switch "a" of bit line switches 322 in FIG. 3 is turned off and the switch "b" of bit line switches 322 is turned on so that the bottom bit line 310B is coupled to the ADC 320 and top bit line 310A is not coupled to the ADC 320. In one example, at the same time, a ground (GND) voltage is supplied to Vbias 326 so that the cascode device 324 is turned off. In this way, the top bit line 310A and the bottom bit line 310B remain electrically separated from one another so the capacitance on the top bit line 310A does not affect the settling time of bottom bit line 310B in accordance with the teachings of the present invention. As will be discussed below, in another example, an intermediate voltage which is low enough to turn off the cascode device 324 is supplied to Vbias 326 so that the top bit line 310A and the bottom bit line 310B remain electrically separated from one another when the bottom bit line 310B is coupled to the ADC 320.

Figure 4:
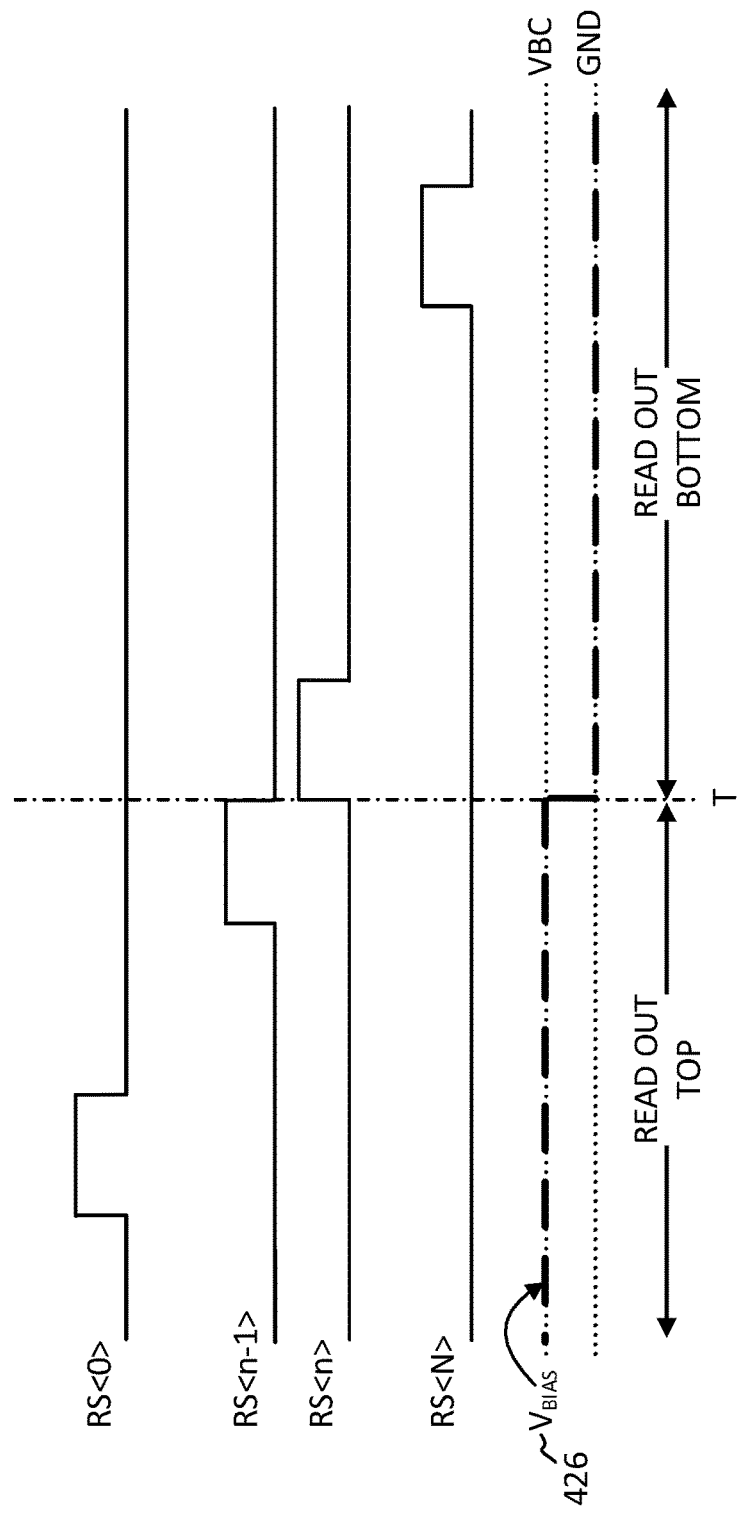
FIG. 4 shows an example timing diagram illustrating reading out image data from a pixel array with divided bit lines in accordance with the teachings of the present invention.

To illustrate, FIG. 4 shows an example timing diagram 400 of reading out image data from a pixel array with divided bit lines in accordance with the teachings of the present invention. It is noted that the example signals illustrated in FIG. 4 may be examples of signals found in stacked sensors 300, and that similarly named and numbered elements referenced below are coupled and function similar to as described above. In the depicted example, it is assumed that the row select (RS) transistors in a row "i" are controlled by a row select signal RS<i>. When the row select signal RS<i> is high for a row "i", the image data signals are read out from the pixels in row "i" that are coupled to the bit line through the respective row select transistors.

As shown, when the image data signals are read out from the top half of pixel array by making one, some, or all of the row select signals RS<0> to RS<n−1> are set to high for Rows 0 through n−1 of the pixel array, an intermediate voltage "VBC" is supplied to Vbias 426 such that the cascode devices (e.g., cascode device 324 in FIG. 3) operate in the saturation region. As shown in the example depicted in FIG. 4, the image data signals are read out from pixels in the top half of the pixel array prior to time T, as indicated with the row select signals RS<0> to RS<n−1> being set to high, and the Vbias 426 signal being set to the intermediate voltage VBC prior to time T. In this way, only the capacitance on the top bit line contributes to the bit line settling time, and the capacitance on the bottom bit line doesn't affect or have any influence on the settling time on the top bit line during a read out operation.

In one example, when signals are read out from bottom half of the pixel array, which occurs after time T in FIG. 4, one, some, or all of the row select signals RS<n> to RS<N> are set to high, and the Vbias 426 signal is pulled down to ground GND (solid line in FIG. 4), which turns off the cascode device (e.g., cascode device 324 in FIG. 3). In this way, the top bit line is disconnected from both the ADC (e.g., ADC 320) and the bit line current source (e.g., bit line current source 328) after time T so that only the capacitance of the bottom bit line affects the settling time. In this way, only the capacitance of either the top bit line or bottom bit line (but not both) contribute to the bit line settling time at any time during the read out of image signal data from the pixel array. Thus, the settling time during the read of the pixel array is reduced by separating the bit lines into smaller portions and therefore smaller capacitances in accordance with the teachings of the present invention.

In another example, when signals are read out from bottom half of the pixel array, which occurs after time T in FIG. 4, the an intermediate voltage "VBC" is also supplied to Vbias 426 (dashed line in FIG. 4) such that the cascode devices (e.g., cascode device 324 in FIG. 3) turns off when reading signals from bottom bit lines. When signals are read out from top half of the pixel array (e.g., from top bit line 310A), the voltage of the bottom half of the bit line (e.g., bottom bit line 310B) is determined by Vbias 326, and the current drawn by the current source 328 and is lower than Vbias 326 to turn on the cascode device 324. However, when signals are readout from bottom bit line 310B, the current can flow through pixels connected to the bottom bit line 310, such as pixels 312C-D, and the voltage of bottom bit line 310B can be determined by the voltage of the floating diffusion (FD) of the pixel circuitry in the pixel array. There is no DC current drawn from the top bit lines when reading signals from bottom bit lines and so the voltage of top bit lines can be kept high enough, for example similar voltage as bottom bit lines, to turn off the cascode device 326 by having a clamping circuit (not shown). In the example, by setting Vbias 426 low enough to turn off the cascode device 324 off when reading out signals from the bottom bit line 310B, the capacitance on the top bit lines 310A do not affect to the setting of bottom bit line 310B. Therefore, in this example, the Vbias 426 voltage can be the same between when reading out from the top bit line 310A (e.g., solid VBC line prior to time T in FIG. 4) and reading out from the bottom bit line 310B (e.g., dashed VBC line after time T in FIG. 4).

Figure 5:
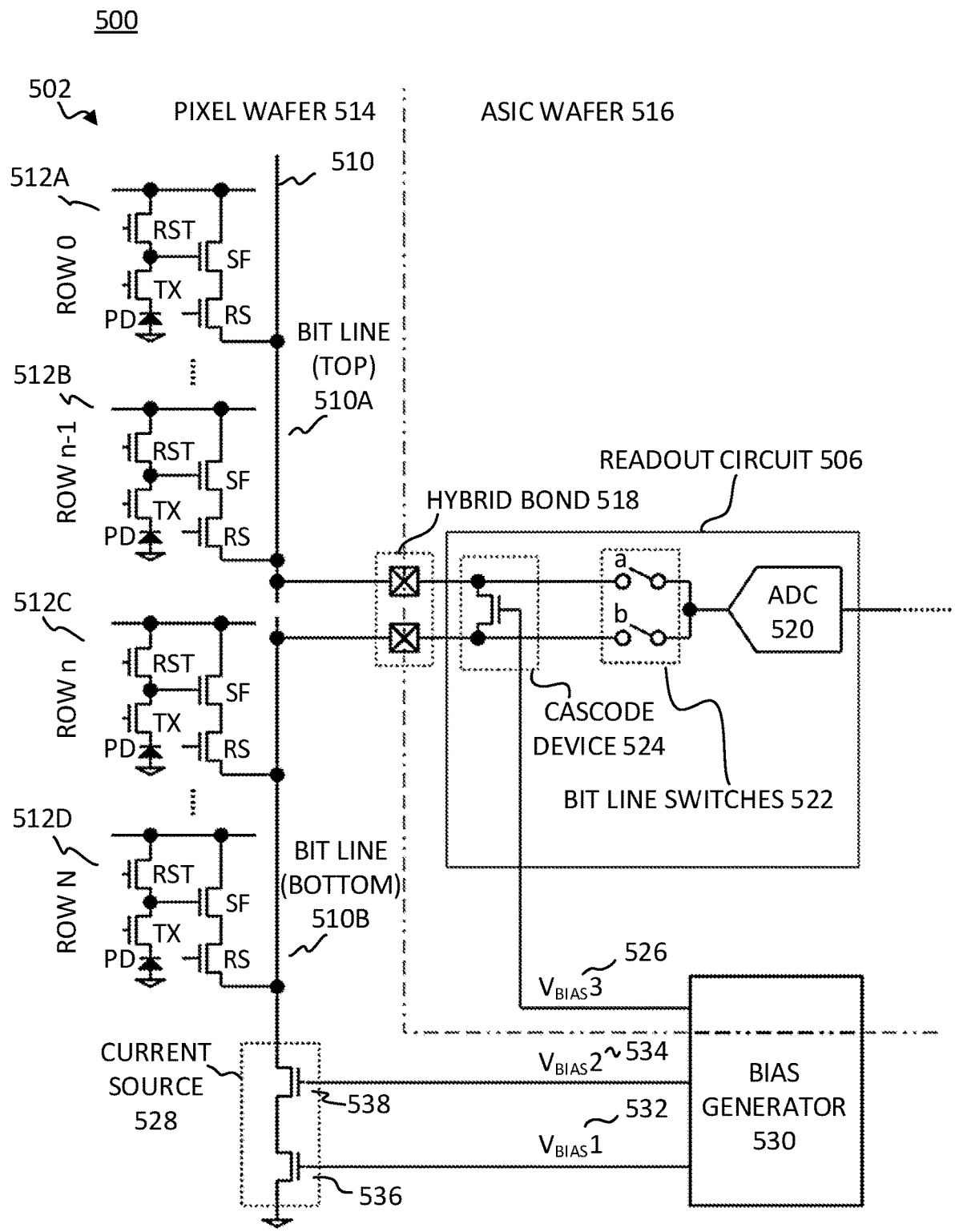
FIG. 5 is a diagram illustrating another example of stacked sensors including a bias generator and readout circuit with a cascode device coupled to read out image data from a pixel array through divided bit lines in an imaging system in accordance with the teachings of the present invention.

FIG. 5 shows another example of stacked sensors 500 implemented with a pixel wafer 514 including a plurality of pixels 512A-512D of a pixel array 502, and an ASIC wafer 516 including readout circuits 506 in accordance with the teachings of the present invention. It is noted that stacked sensors 500 of FIG. 5 shares similarities with stacked sensors 300 of FIG. 3, and that similarly named and numbered elements referenced below are coupled and function similar to as described above. Thus, in order to read out signals from a pixel (e.g., 512A-B) coupled to the top bit line 510A, the switch "a" of bit line switches 522 in FIG. 5 is turned on and the switch "b" of bit line switches 522 is turned off so that the top bit line 510A is coupled to the ADC 520 and bottom bit line 510B is not coupled to the ADC 520. At the same time, an intermediate voltage is supplied to Vbias3 526, which causes the cascode device 524 coupled between the top bit line 510A and the bottom bit line 510B through hybrid bonds 518 to operate in the saturation region. In this way, the top bit line 510A and the bottom bit line 510B remain electrically separated from one another so the capacitance on the bottom bit line 510B still does not affect the settling time of top bit line 510A, in accordance with the teachings of the present invention.

To read out signals from a pixel (e.g., 512C-D) coupled to the bottom bit line 510B, the switch "a" of bit line switches 522 in FIG. 5 is turned off and the switch "b" of bit line switches 522 is turned on so that the bottom bit line 510B is coupled to the ADC 520 and top bit line 510A is not coupled to the ADC 520. At the same time, a ground (GND) voltage is supplied to Vbias3 526 so that the cascode device 524 is turned off. In this way, the top bit line 510A and the bottom bit line 510B remain electrically separated from one another so the capacitance on the top bit line 510A does not affect the settling time of bottom bit line 510B, in accordance with the teachings of the present invention.

One difference between stacked sensors 500 of FIG. 5 and stacked sensors 300 of FIG. 3 is that example stacked sensors 500 of FIG. 5 includes a bias generator 530 coupled to generate a plurality of bias voltage signals including a first bias voltage Vbias1 532, a second bias voltage Vbias2 534, and the third bias voltage Vbias3 526. In the illustrated example, bias circuitry 530 includes a first portion on the ASIC wafer 516 coupled to generate third bias voltage Vias3 526, while a second portion on pixel wafer 514 is coupled to generate first bias voltage Vbias1 532 and second bias voltage Vbias2 534. In another example, it is appreciated that bias circuitry 530 may all be on pixel wafer 514, or may all be on ASIC wafer 516, as well as being on both pixel wafer 514 and ASIC wafer 516 as illustrated.

Another difference between stacked sensors 500 of FIG. 5 and stacked sensors 300 of FIG. 3 is that bit line current source 528 is illustrated in FIG. 5 as including cascode coupled transistor 538 coupled to a transistor 536, which are coupled to bottom bit line 510B as shown. Transistor 536 is a current source device that coupled to be biased with first bias voltage Vbias1 532, and cascode coupled transistor 538 is a cascode device that is coupled to be biased with second bias voltage Vbias 534.

It is appreciated that bit line current source 528 addresses a situation where there is could be a difference in the drain voltage of the current source 528 between the two different operations of reading out image signal data from the top bit line 510A or reading out image signal data from the bottom bit line 510B. To compensate for this potential difference in the drain voltage, the bit line bias current drawn by the bit line current source 528 is changed in accordance with the teachings of the present invention. Indeed, without compensation, a difference in the current through bit line current source 528 may cause a difference in signals, which ends up with a gap between top and bottom parts of an image.

Thus, in order to reduce the drain voltage difference between top bit line 510A and bottom bit line 510B readouts, the bit line current source 528 shown in FIG. 5 includes the current source device and the cascode device provided with cascode coupled transistors 536 and current source devices 538, respectively, as shown in FIG. 5. Bias generator 530 is coupled to provide the bias voltages Vbias1 532 and Vbias2 534 for the bit line current source 528, as well as the bias voltage Vbias3 526 for the cascode device 524 in the readout circuits 506.

In operation, bias generator 530 sets Vbias1 532 to make the bit line current source 528 operate in saturation region to draw the appropriate bias current from bit line 510. As will be shown, it is appreciated that there are different ways to control Vbias2 534 and Vbias3 526. For instance, when the required voltage range of bit line is small enough (i.e., when analog gain is high), both cascode devices 524 and 538 can be used at the same time when reading signals from top bit line 510A. On the other hand, when required voltage range of bit line 510 is large (i.e., when analog gain is low), one of the cascode devices 524 and 538 can be disabled to increase voltage range.

Figure 6A:
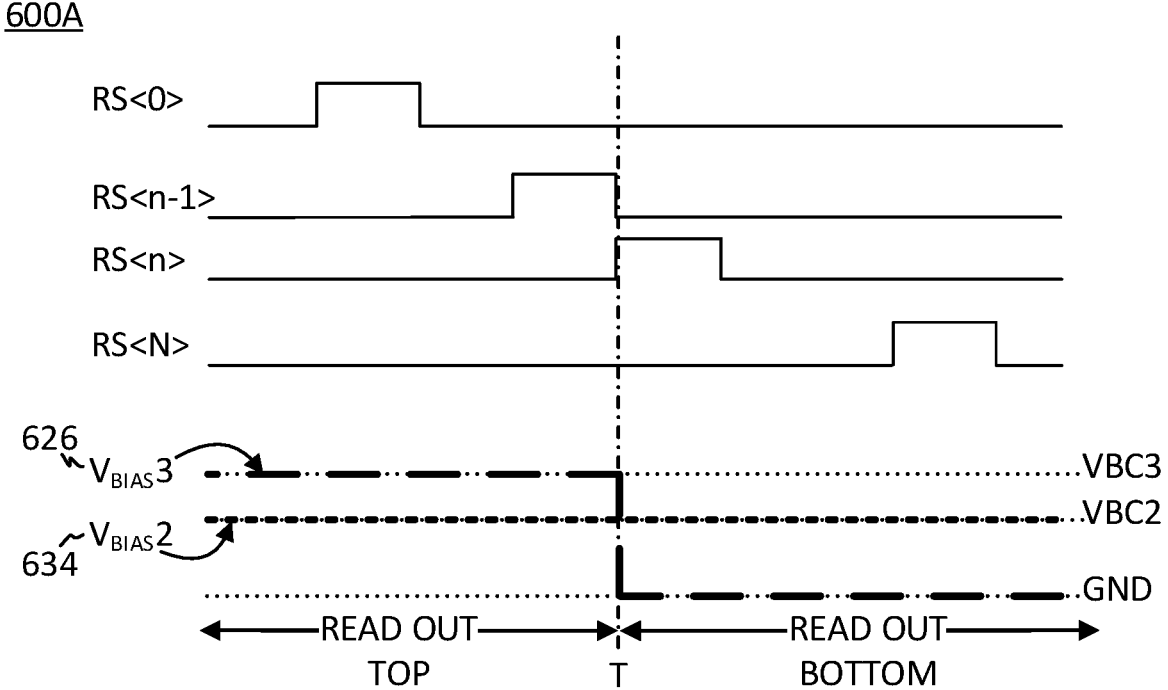
FIG. 6A shows another example timing diagram illustrating reading out image data from a pixel array with divided bit lines in accordance with the teachings of the present invention.

To illustrate, FIG. 6A shows one example timing diagram 600A of reading out image data from a stacked sensors 500 with divided bit lines in accordance with the teachings of the present invention. As such, it is appreciated that the example signals illustrated in FIG. 6A may be examples of signals found in stacked sensors 500, and that similarly named and numbered elements referenced below are coupled and function similar to as described above. FIG. 6A shows an example in which the required voltage range is small enough (i.e., when analog gain is high). In this example, intermediate voltages VBC2 and VBC3 are supplied to both Vbias2 634 and Vbias3 626, respectively, during the read out of signals from the top bit line (e.g., 510) and both of cascode devices (e.g., 538 and 524) are operating in the saturation region prior to time T. After time T, Vbias3 626 is pulled down to ground GND when signals are read out from bottom bit lines (e.g., 510B). In this way, the drain voltage of the bit line current source device (e.g., 536) is always determined by the cascode device (e.g., 538) in the bit line current source (e.g., 528) so that there is no difference in bit line bias current between the top and bottom bit line reads in accordance with the teachings of the present invention.

Figure 6B:
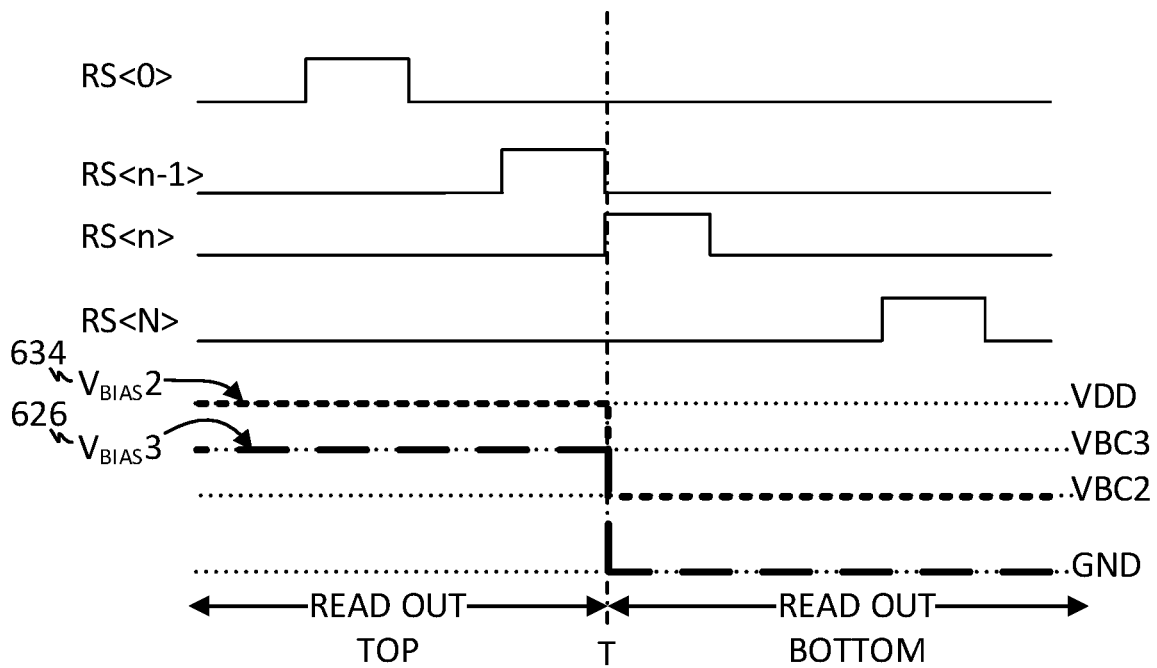
FIG. 6B shows yet another example timing diagram illustrating reading out image data from a pixel array with divided bit lines in accordance with the teachings of the present invention.

FIG. 6B shows another example timing diagram 600B that illustrates an example when more voltage range is required (i.e., when analog gain is low). In the depicted example, the intermediate voltage VBC3 is supplied to Vbias3 626 prior to time T such that the cascode device (e.g., 524) in the readout circuit (e.g., 506) operates in the saturation region and therefore isolates the capacitance of the bottom bit line (e.g., 510) from being seen by the ADC (e.g., 520) during the read out of image data signals from the top bit line (e.g., 510A). A VDD voltage is supplied to Vbias2 634 that causes the cascode device (e.g., 538) of the bit line current source (e.g., 528) to work in linear region, and is therefore bypassed prior to time T. However, after time T, when reading out image data signal from the bottom bit line, the bias voltage supplied to Vbias2 634 transitions from VDD to the intermediate voltage VBC2, which causes the cascode device (e.g., 538) of the bit line current source (e.g., 528) to work in the saturation region, and the bias voltage suppled to Vbias3 626 transitions from the intermediate voltage VBC3 to ground GND, which turns off the cascode device (e.g., 524) in the readout circuit (e.g., 506).

Therefore, the drain voltage of the bit line current source device 536 is determined by the cascode device 524 in the readout circuit 506 when reading out image signal data from the top bit line 510A prior to time T, and then by the cascode device 538 in the bit line current source 528 when reading out image signal data from the bottom bit line 510B after time T in accordance with the teachings of the present invention. In the depicted examples, the intermediate voltage values for VBC2 and VBC3 are precisely controlled by bias generator 530 to keep the drain voltage of the bit line current source 528 unchanged between the top and bottom bit line reads in accordance with the teachings of the present invention.

Figure 7:
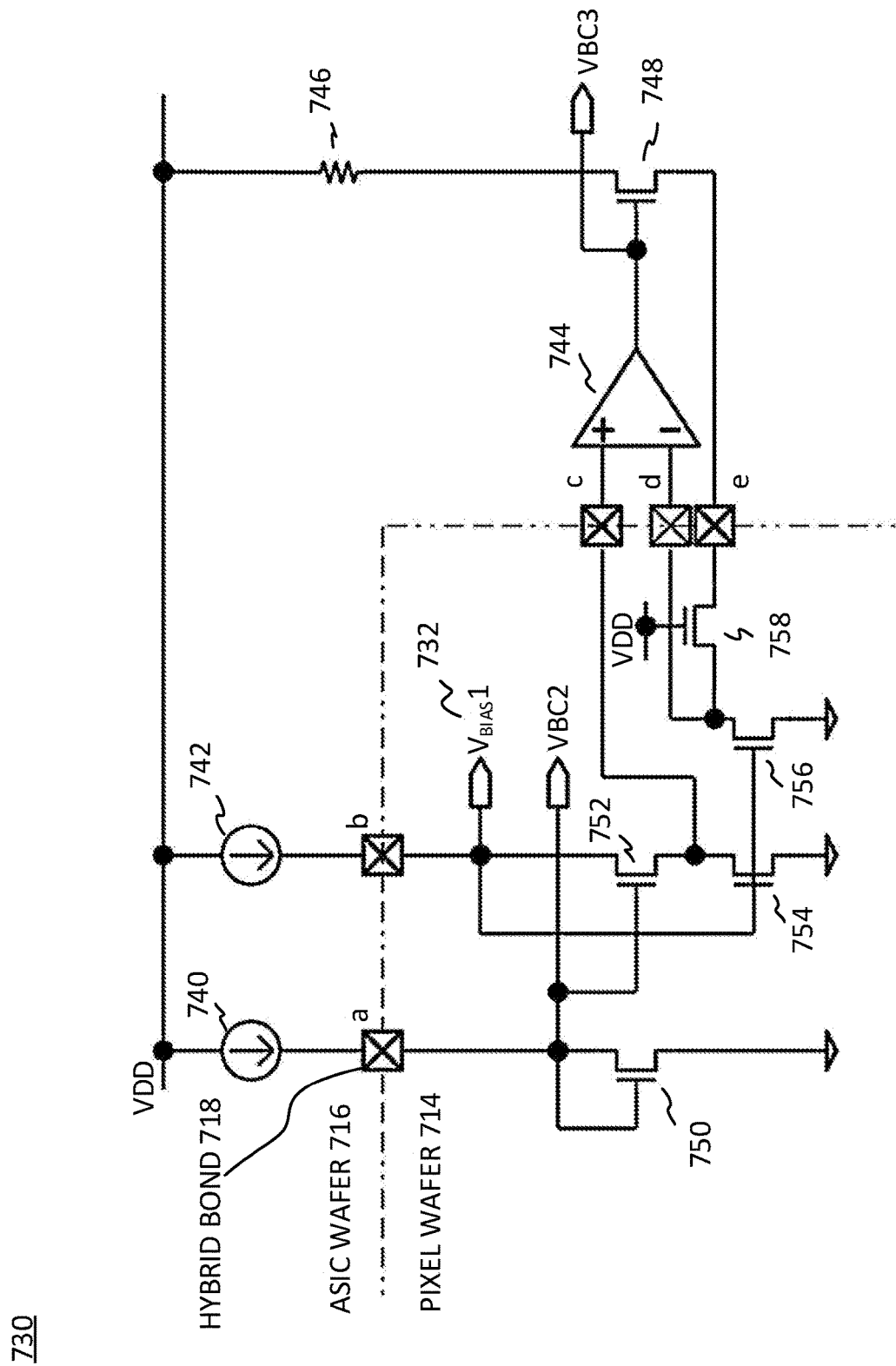
FIG. 7 is a schematic illustrating one example of a bias generator configured to generate bias signals in an imaging system in accordance with the teachings of the present invention.

FIG. 7 shows one example of the bias generator 730 to generate the bias voltages VBC2 and VBC3 in accordance with the teachings of the present invention. It is noted that the bias generator 730 illustrated in FIG. 7 may be one example of bias generator 530 of FIG. 5, and that similarly named and numbered elements referenced below are coupled and function similar to as described above. Similar to the examples described previously, bias circuitry 730 includes a first portion on the ASIC wafer 716 and a second portion on pixel wafer 714. In the depicted example, the separate portions of bias circuitry 730 are coupled together between the ASIC wafer 716 and the pixel wafer 714 through hybrid bonds 718, which are labeled "a", "b", "c", "d", and "e" as shown. In one example, the portion of bias circuitry 730 on the pixel wafer 714 is coupled to generate bias voltages for the bit line current sources on the pixel wafer 714, including Vbias1 732 and VBC2, which may be used for Vbias2. The portion of bias circuitry 730 on the ASIC wafer 716 is coupled to generate the bias voltage for the cascode device 524 in the readout circuit 506, VBC3, which may be used for Vbias3. In the depicted example, VBC3 is regulated to make the drain voltage of the bit line current source device 536 the same as when the cascode device 538 in the bit line current source 528 is used.

As shown in the example depicted in FIG. 7, the portion of bias generator 730 on ASIC wafer 716 includes a current source 740 coupled between VDD and the hybrid bond 718 labeled "a", a current source 742 coupled between VDD and the hybrid bond 718 labeled "b". The portion of bias generator 730 on ASIC wafer 716 also includes a differential amplifier 744 having a non-inverting input coupled to the hybrid bond 718 labeled "c" and an inverting input coupled to the hybrid bond 718 labeled "d". A resistor 746 is coupled between VDD and a first terminal of a transistor 748. A second terminal of transistor 748 is coupled to the hybrid bond 718 labeled "e". The output of a differential amplifier 744 is coupled to a gate terminal of transistor 748. In the depicted example, it is appreciated that transistor 748 is a replica of (i.e., has the same specifications as) the transistor used in the cascode device 524 of readout circuit 506. The output of differential amplifier 744 is also coupled to output VBC3, which as described in FIGS. 6A-6B, may be used for Vbias3 626 to drive the cascode device 524 during the read out of image data signals from the top bit line 510A.

Referring back to FIG. 7, the portion of bias generator 730 on pixel wafer 714 includes a transistor 750 coupled between current source 740 through the hybrid bond 718 labeled "a" and ground. A gate terminal of transistor 750 is also coupled to current source 740 through the hybrid bond 718 labeled "a". A transistor 752 is coupled between current source 742 through the hybrid bond 718 labeled "b" and a transistor 754. A gate terminal of transistor 752 is coupled to the gate terminal of transistor 750, and is also coupled to generate VBC2, which may be used to generate Vbias2 634 as shown in FIGS. 6A-6B. Transistor 754 is coupled between transistor 752 and ground. As such, transistor 752 is cascode coupled to transistor 754. A gate terminal of transistor 754 is coupled to current source 742 through the hybrid bond 718 labeled "b", and is also coupled to generate Vbias1, which may be used to drive the current source device, transistor 536, of bit line current source 528 as shown in FIG. 5. In addition, a transistor 758 is coupled between transistor 748 through the hybrid bond 718 labeled "e" and a transistor 756. A gate terminal of transistor 758 is coupled to VDD. Transistor 756 is coupled between transistor 758 and ground. A gate terminal of transistor 756 is also coupled to the gate terminal of transistor 754, which is coupled to generate Vbias1 732 as discussed above. The intermediate node between transistors 756 and 758 is coupled to an inverting input of differential amplifier 744 through the hybrid bond 718 labeled "d". The intermediate node between transistors 752 and 754 is coupled to a non-inverting input of differential amplifier 744 through the hybrid bond 718 labeled "c".

In the depicted example, it is appreciated that transistors 752 and 758 are replicas of (i.e., have the same specifications as) transistor 538, which is used as the cascode device of the bit line current source 528, and that transistors 754 and 756 are replicas of (i.e., have the same specifications as) transistor 536, which is used as the current source device of bit line current source 528. As such, it is therefore appreciated that transistor 758 mimics or replicates the IR voltage drop across cascode device 538 of bit line current source 528 when cascode device 538 is bypassed when VDD is applied via Vbias2 634 to the gate of cascode device 538 as shown for example in FIG. 6B.

Figure 8A:
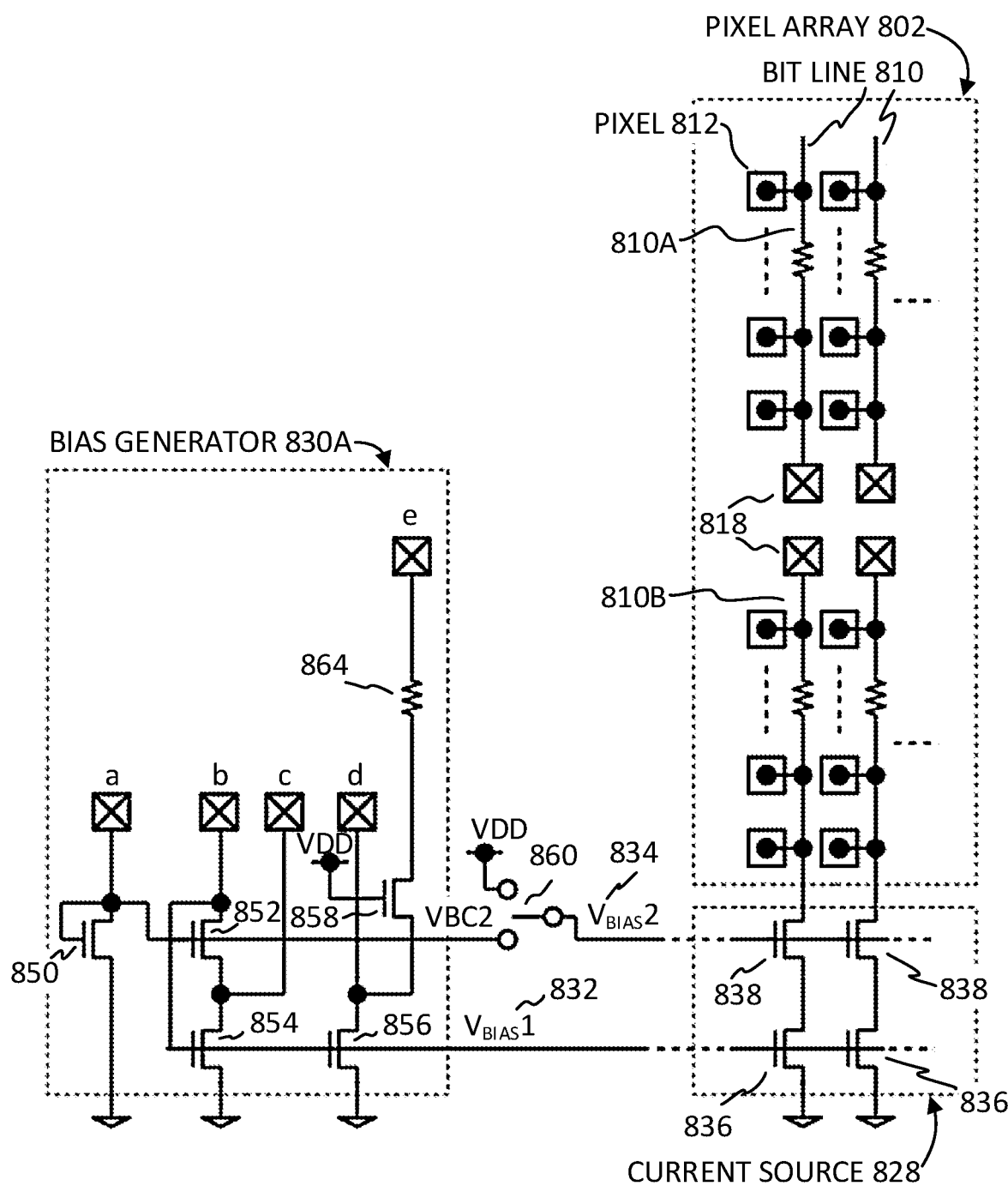
FIG. 8A is a diagram illustrating another example of stacked sensors including a portion of bias generator and a pixel array included in a pixel wafer of an imaging system in accordance with the teachings of the present invention.

FIG. 8A shows an example of a portion of stacked sensors including a plurality of pixels 812 of a pixel array 802 as well as a portion of a bias generator 830A implemented on a pixel wafer 814 in accordance with the teachings of the present invention. It is noted that the example pixel array 802 and bias generator 830A portion illustrated in FIG. 8A shares similarities with the relevant portions of example stacked sensor 500 illustrated in FIG. 5 and the bias generator 730 illustrated in FIG. 7, and that similarly named and numbered elements referenced below are coupled and function similar to as described above.

The example depicted in FIG. 8A illustrates a plurality of columns of pixels 812 in pixel array 802, with each column coupled to a respective bit line 810. Each bit line has a top portion 810A and a bottom portion 810B. In the illustrated example, a bit line current source 828 includes a cascode device 838 and a current source device 836 coupled to the bottom portion 810B of each bit line 810 as shown. The gate terminal of the transistor of each current source device 836 is coupled to be biased with Vbias1 832, and the gate terminal of the transistor of each cascode device 838 is coupled to be biased with Vbias2 834. A switch 860 is coupled to select whether bias signal Vbias2 834 is supplied with voltage VDD or intermediate voltage VBC2 generated by bias generator 830A, as illustrated and described for example in FIGS. 6A-6B above.

Figure 8B:
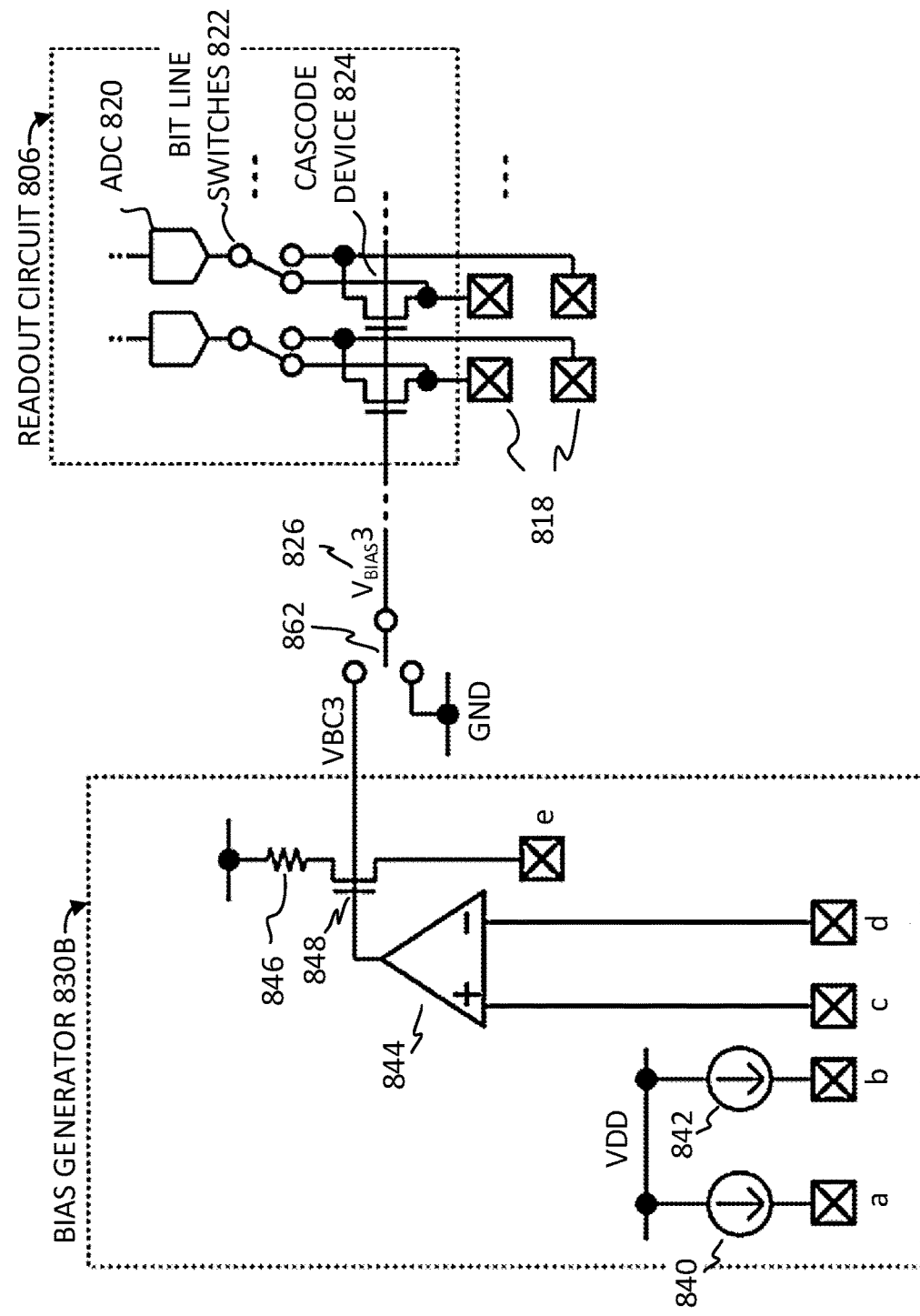
FIG. 8B is a diagram illustrating yet another example of stacked sensors including a portion of bias generator and a readout circuit included in an ASIC wafer of an imaging system in accordance with the teachings of the present invention.

FIG. 8B shows an example of a portion of stacked sensors including readout circuit 806 as well as a portion of a bias generator 830B implemented on an ASIC wafer 816 in accordance with the teachings of the present invention. It is noted that the example readout circuits 806 and bias generator 830B portion illustrated in FIG. 8B shares similarities with the relevant portions of example stacked sensor 500 illustrated in FIG. 5 and the bias generator 730 illustrated in FIG. 7, and that similarly named and numbered elements referenced below are coupled and function similar to as described above.

The example depicted in FIG. 8B illustrates readout circuits 806 coupled to read out image signal data from a plurality of columns of a pixel array (e.g., 802) through hybrid bonds 818. A cascode device 824 is coupled between the top and bottom portions (e.g., 810A and 810B) of each bit line, and bit line switches 822 are configured to couple each respective ADC 820 to either the top portion or the bottom portion of the bit line for each column as described above. The gate terminal of the transistor of each cascode device 826 is coupled to be biased with bias signal Vbias3 826. A switch 862 is coupled to select whether bias signal Vbias3 826 is supplied with intermediate voltage VBC3 generated by bias generator 830B or voltage VDD, as illustrated and described for example in FIGS. 6A-6B above.

With reference to FIGS. 8A-8B, it is noted that with the bias current provided by bit line current source 828, an IR voltage drop may occur across bit lines 810 during a read out operation, which can affect the drain voltage at the bit line current source 828. FIGS. 8A-8B show the example portions of bias generator 830A/830B, which can adjust the intermediate voltage VBC3 based on the IR voltage drop. To illustrate, FIG. 8A shows the circuitry on the pixel wafer 814 with a hybrid bond "e" and a parasitic resistance, which is represented in FIG. 8A as parasitic resistance 864. As shown in the depicted example, the hybrid bond "e" is located such that the vertical position of the hybrid bond "e" is near or proximate to hybrid bonds 818 that are coupled to the bit lines 810. In this way, the parasitic resistance 864 in the bias generator 830A/830B is proportional to that of the bit lines 810. There is no limitation for the position of hybrid bonds "a", "b", "c", and "d". In addition, FIG. 8B shows that the bias generator 830B has a differential amplifier 844, which during operation make the non-inverting and inverting inputs, which are coupled to hybrid bonds "c" and "d", the same voltage. In this way, the intermediate voltage VBC3 output of differential amplifier 844 shown in FIG. 8B is regulated to make drain voltage of the current source device 836 the same as when the cascode device 838 in the bit line current source 828 is used.

Figure 9:
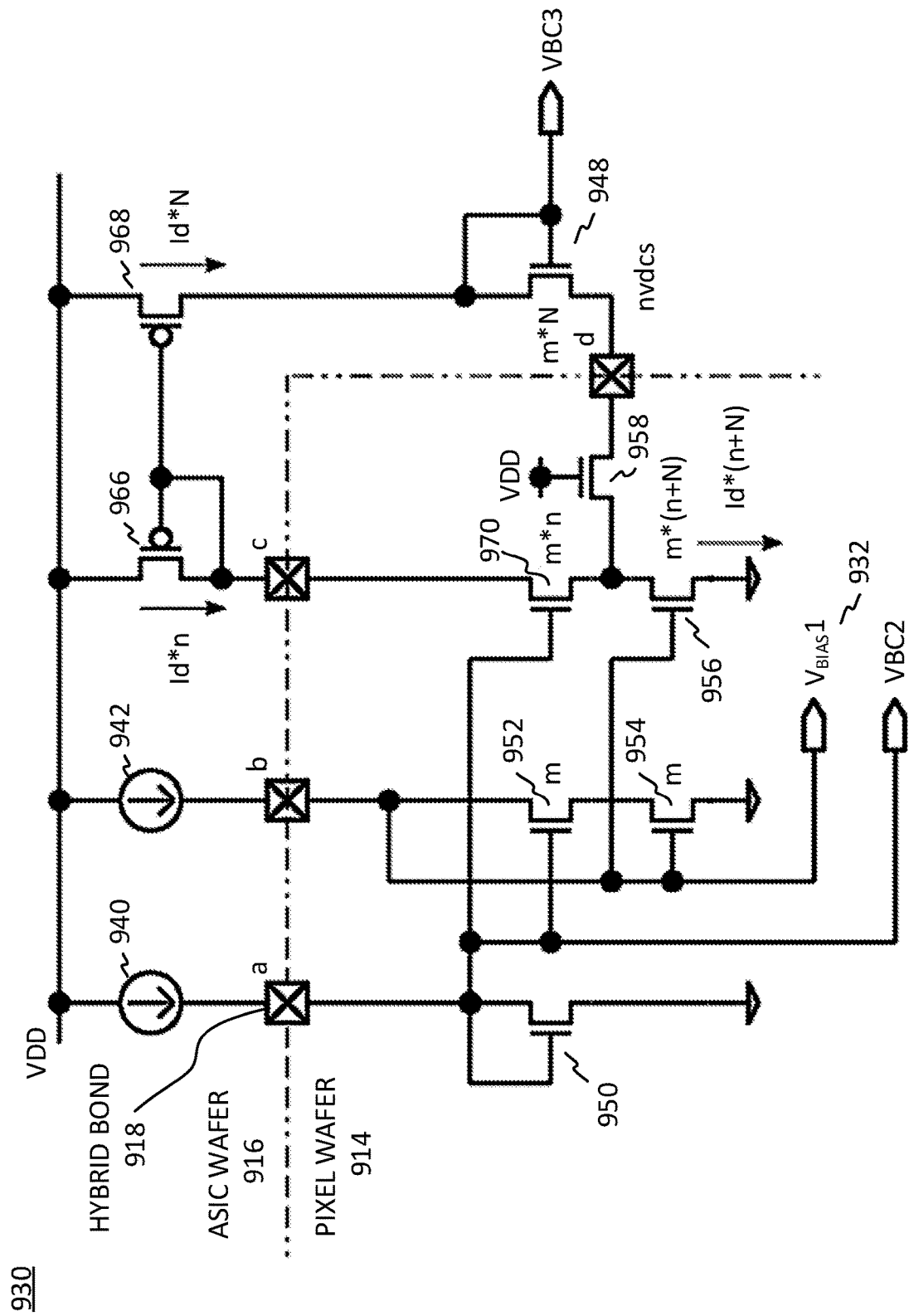
FIG. 9 is a schematic illustrating another example of a bias generator configured to generate bias signals in an imaging system in accordance with the teachings of the present invention.

FIG. 9 shows another example of the bias generator 930 in accordance with the teachings of the present invention. It is noted that the bias generator 930 illustrated in FIG. 9 shares many similarities with bias generator 830A/830B of FIGS. 8A-8B, bias generator 730 of FIG. 7, or of bias generator 530 of FIG. 5, and that similarly named and numbered elements referenced below are coupled and function similar to as described above. Similar to the examples described previously, bias circuitry 930 is also illustrated as being separated into two portions, with one portion being disposed on the pixel wafer 914 and the other portion being disposed on the ASIC wafer 916.

As will be discussed, the portion of bias circuitry 930 disposed on the pixel wafer 914 is configured to generate bias voltages Vbias1 932 and VBC2, which may be used for the bit line current source on the pixel wafer 914, and the portion bias circuitry 930 disposed on the ASIC wafer 916 is configured to generate the bias voltage VBC3, which may be used for the cascode device in the readout circuit. In the depicted example, the separate portions of bias circuitry 930 are coupled together between the ASIC wafer 916 and the pixel wafer 914 through hybrid bonds 918, which are labeled "a", "b", "c", and "d" as shown. In the depicted example, VBC3 is regulated to make the drain voltage of the current source device the same as when the cascode device in the current source circuit is used. Node "nvdcs" is regulated to be the same voltage as drain of the current source device when the cascode device in the current source is used, and VBC3 is regulated to make the source of the cascode device in the readout circuit the same as "nvdcs". As a result, the drain voltage of the current source device can be the same between when the cascode device in the current source is used and when the one in the readout circuit is used.

To illustrate, in the example depicted in FIG. 9, the portion of bias generator 930 on ASIC wafer 916 includes a current source 940 coupled between VDD and the hybrid bond 918 labeled "a", a current source 942 coupled between VDD and the hybrid bond 918 labeled "b". The portion of bias generator 930 on ASIC wafer 716 also includes a current mirror circuit including a pair of transistors 966 and 968 having gate terminals that are coupled together. In the depicted example, the ratio of the respective currents through transistor 966 and transistor 968 is set such that the current through transistor 966 is substantially equal to Id*n, and the current through transistor 968 is substantially equal to Id*N. The source terminals of transistors 966 and 968 are coupled to VDD, and the gate terminals of transistors 966 and 968 are coupled together and to the drain terminal of transistor 966 and to the hybrid bond 918 labeled "c" as shown. Transistor 968 is also coupled between VDD and a first terminal of a transistor 948. A second terminal of transistor 948 is coupled to the hybrid bond 918 labeled "d". The intermediate node between transistors 968 and 948 is coupled to a gate terminal of transistor 948, which is coupled to output VBC3. In the depicted example, it is appreciated that transistor 948 is a scaled replica of the transistor used in the cascode device of readout circuit. In addition, with transistor 948 being coupled to transistor 968 of the current mirror circuit, the specifications of transistor 948 are substantially equal to m*N as shown.

The portion of bias generator 930 on pixel wafer 914 includes a transistor 950 coupled between current source 940 through the hybrid bond 918 labeled "a" and ground. A gate terminal of transistor 950 is also coupled to current source 940 through the hybrid bond 918 labeled "a". A transistor 952 is coupled between current source 942 through the hybrid bond 918 labeled "b" and a transistor 954. A gate terminal of transistor 952 is coupled to the gate terminal of transistor 950, and is also coupled to generate VBC2, which may be used to generate Vbias2 634 as shown for example in FIGS. 6A-6B. Transistor 954 is coupled between transistor 952 and ground. As such, transistor 952 is cascode coupled to transistor 954. A gate terminal of transistor 954 is coupled to current source 942 through the hybrid bond 918 labeled "b", and is also coupled to generate Vbias1 932, which may be used to drive the current source device of the bit line current source. In addition, a transistor 958 is coupled between transistor 948 through the hybrid bond 918 labeled "d" and a transistor 956. A gate terminal of transistor 958 is coupled to VDD. Transistor 956 is coupled between transistor 958 and ground. A gate terminal of transistor 956 is also coupled to the gate terminal of transistor 954, which is coupled to generate Vbias1 932 as discussed above. A transistor 970 is coupled between transistor 966 through the hybrid bond 918 labeled "c" and the intermediate node between transistors 956 and 958. With transistor 970 being coupled to transistor 966 of the current mirror circuit, the specifications of transistor 970 are substantially equal to m*n as shown. A gate terminal of transistor 970 is also is coupled to the gate terminals of transistors 950 and 952, and is also coupled to generate VBC2, which as discussed above may be used to generate Vbias2. In the depicted example, it is appreciated that transistors 952 and 970 are scaled replicas of the cascode device of the bit line current source, and that transistors 954 and 956 are scaled replicas of the current source device of bit line current source. In addition, with transistor 956 being coupled to sink the current from the current mirror circuit through transistors 970 and 948 (through transistor 958), the specifications of transistor 956 are substantially equal to m*(n+N) such that the current through transistor 958 is substantially equal to (Id*n)+(Id*N), or Id*(n+N) as shown. The transistors 966, 968, 970, 948, and 956 form an amplifier to regulate the source voltage of the transistor 970 to be the same as the source voltage of the transistor 952.

Figure 10A:
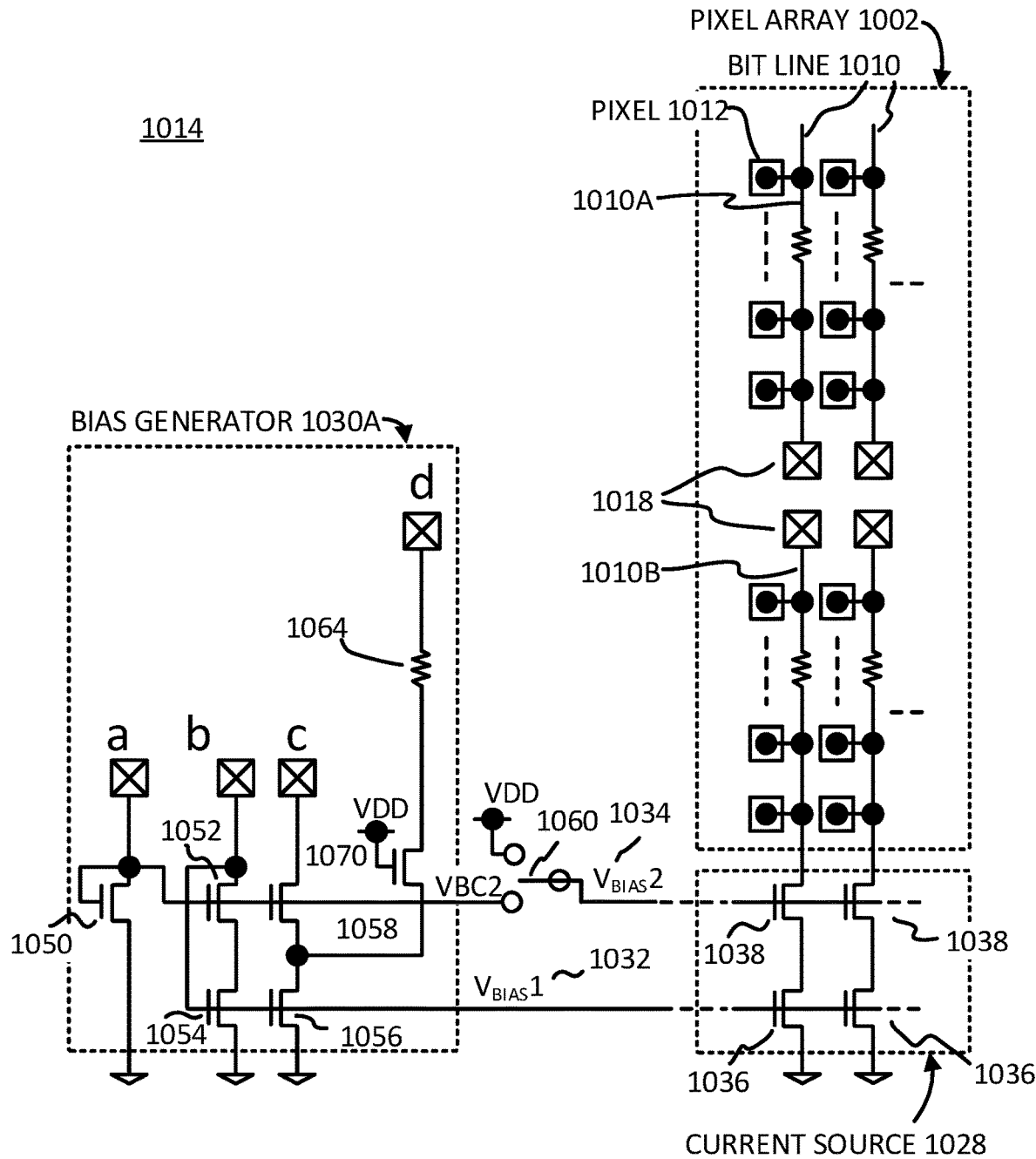
FIG. 10A is a diagram illustrating still another example of stacked sensors including a portion of bias generator and a pixel array included in a pixel wafer of an imaging system in accordance with the teachings of the present invention.

FIG. 10A shows an example of a portion of stacked sensors including a plurality of pixels 1012 of a pixel array 1002 as well as a portion of a bias generator 1030A implemented on a pixel wafer 1014 in accordance with the teachings of the present invention. It is noted that the example pixel array 1002 and bias generator 1030A portion illustrated in FIG. 10A shares similarities with the relevant portions of example stacked sensor 500 illustrated in FIG. 5 and the bias generator 930 illustrated in FIG. 9, and that similarly named and numbered elements referenced below are coupled and function similar to as described above.

The example depicted in FIG. 10A illustrates a plurality of columns of pixels 1012 in pixel array 1002, with each column coupled to a respective bit line 1010. Each bit line has a top portion 1010A and a bottom portion 1010B. In the illustrated example, a bit line current source 1028 includes a cascode device 1038 and a current source device 1036 coupled to the bottom portion 1010B of each bit line 1010 as shown. The gate terminal of the transistor of each current source device 1036 is coupled to be biased with Vbias1

1032, and the gate terminal of the transistor of each cascode device 1038 is coupled to be biased with Vbias2 1034. A switch 1060 is coupled to select whether bias signal Vbias2 1034 is supplied with voltage VDD or intermediate voltage VBC2 generated by bias generator 1030A, as illustrated and described for example in FIGS. 6A-6B above.

Figure 10B:
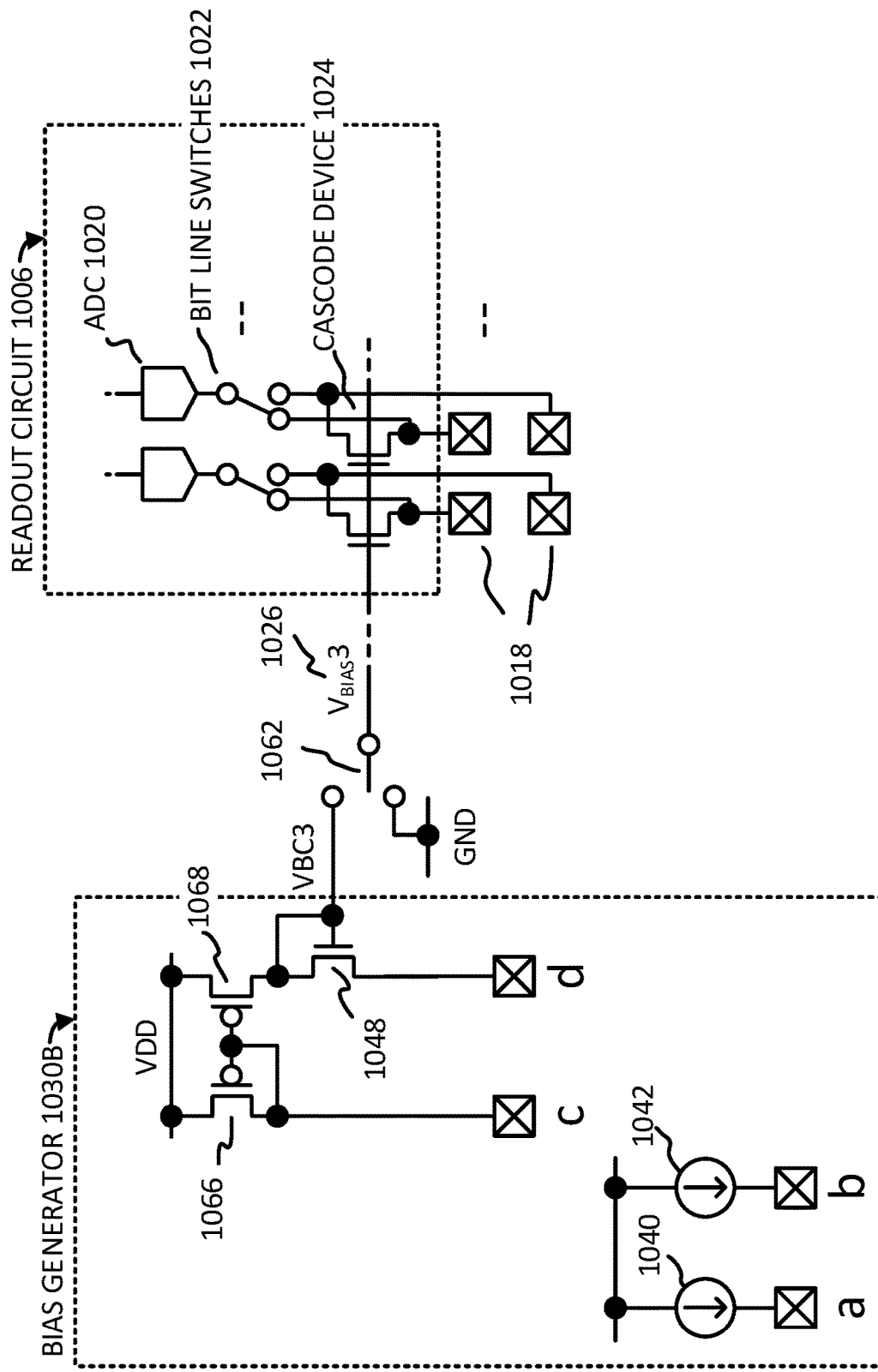
FIG. 10B is a diagram illustrating yet another example of stacked sensors including a portion of bias generator and a readout circuit included in an ASIC wafer of an imaging system in accordance with the teachings of the present invention.

FIG. 10B shows an example of a portion of stacked sensors including readout circuit 1006 as well as a portion of a bias generator 1030B implemented on an ASIC wafer 1016 in accordance with the teachings of the present invention. It is noted that the example readout circuits 1006 and bias generator 1030B portion illustrated in FIG. 8B shares similarities with the relevant portions of example stacked sensor 500 illustrated in FIG. 5 and the bias generator 930 illustrated in FIG. 9, and that similarly named and numbered elements referenced below are coupled and function similar to as described above.

The example depicted in FIG. 10B illustrates readout circuits 1006 coupled to read out image signal data from a plurality of columns of a pixel array (e.g., 1002) through hybrid bonds 1018. A cascode device 1024 is coupled between the top and bottom portions (e.g., 1010A and 1010B) of each bit line, and bit line switches 1022 are configured to couple each respective 10DC 820 to either the top portion or the bottom portion of the bit line for each column as described above. The gate terminal of the transistor of each cascode device 1026 is coupled to be biased with bias signal Vbias3 1026. A switch 1062 is coupled to select whether bias signal Vbias3 1026 is supplied with intermediate voltage VBC3 generated by bias generator 1030B or voltage VDD, as illustrated and described for example in FIGS. 6A-6B above.

With reference to FIGS. 10A-10B, it is noted that with the bias current provided by bit line current source 1028, an IR voltage drop may occur across bit lines 1010 during a read out operation, which can affect the drain voltage at the bit line current source 1028. FIGS. 10A-10B show the example portions of bias generator 1030A/1030B, which can adjust the intermediate voltage VBC3 based on the IR voltage drop. To illustrate, FIG. 10A shows the circuitry on the pixel wafer 1014 with a hybrid bond "d" and a parasitic resistance, which is represented in FIG. 10A as parasitic resistance 1064. Similar to the example described in FIG. 8A, the hybrid bond "d" that is illustrated in FIG. 10A is located such that the vertical position of the hybrid bond "d" is near or proximate to hybrid bonds 1018 that are coupled to the bit lines 1010. In this way, the parasitic resistance 1064 in the bias generator 1030A/1030B is proportional to that of the bit lines 1010. There is no limitation for the position of hybrid bonds "a", "b", "c", and "d". In addition, FIG. 10A and FIG. 10B show that the bias generator 1030A and 1030B have an amplifier, which comprises transistors 1070, 1058, 1056, 1066, 1068, and 1048, and during operation make the source voltage of the transistor 1070 the same as the source voltage of cascode devices 1038 in current source 1028. In this way, the intermediate voltage VBC3 shown in FIG. 10B is regulated to make drain voltage of the current source device 836 the same as when the cascode device 838 in the bit line current source 828 is used. There is no limitation for the position of hybrid bonds "a", "b", and "c". In this way, VBC3 can be determined to make the drain voltage of the current source device 1036 the same as when the cascode device 1038 in the bit line current source 1028 is used.

Figure 11:
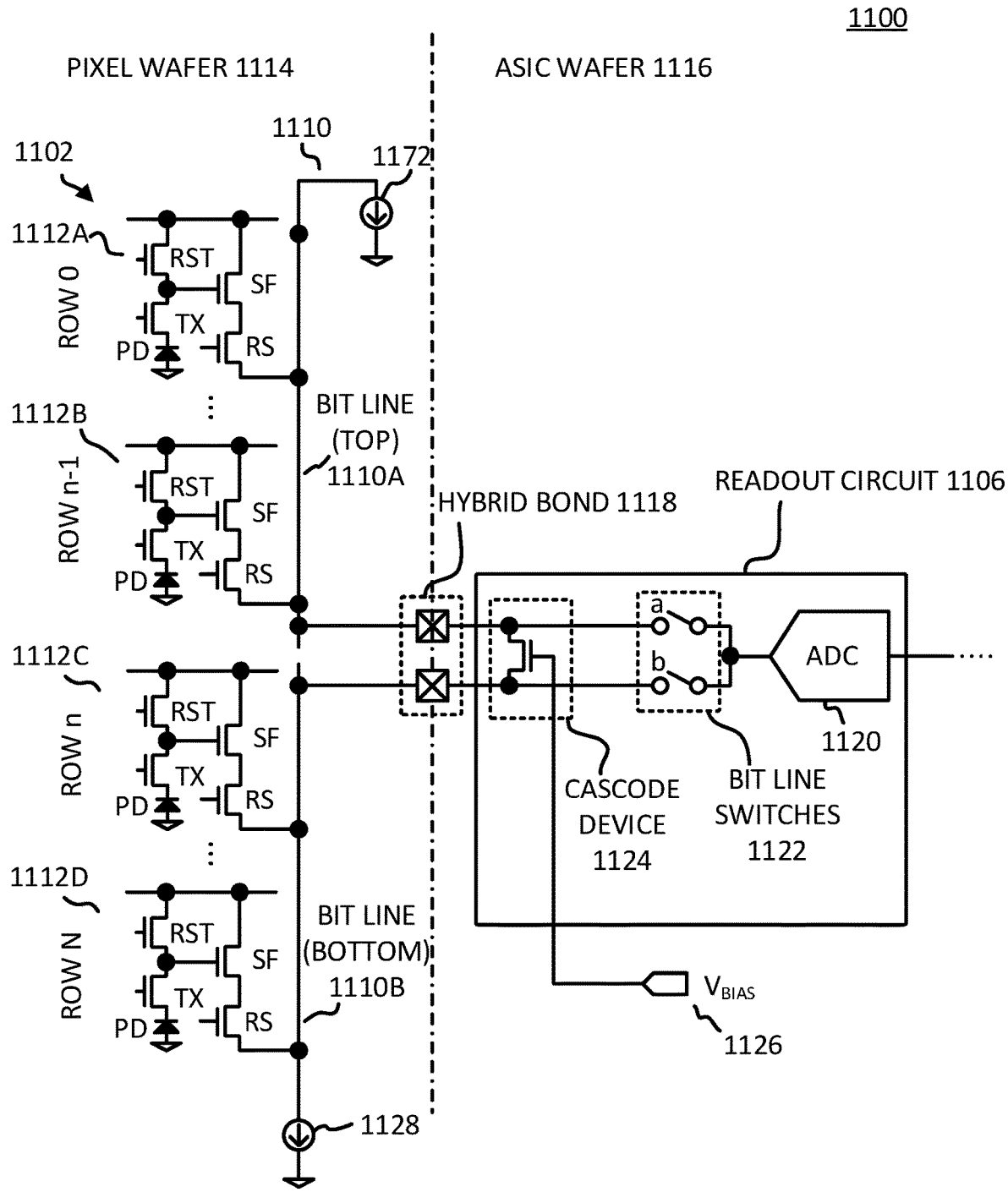
FIG. 11 is a diagram illustrating yet another example of stacked sensors including a readout circuit including a cascode device coupled to read out image data from a pixel array through divided bit lines in an imaging system in accordance with the teachings of the present invention.

FIG. 11 shows yet another example of stacked sensors 1100 implemented with a pixel wafer 1114 including a plurality of pixels 1112A-1112D of a pixel array 1102, and an ASIC wafer 1116 including readout circuits 1106 in accordance with the teachings of the present invention. It is noted that stacked sensors 1100 of FIG. 11 shares similarities with stacked sensors 500 of FIG. 5 or stacked sensors 300 of FIG. 3, and that similarly named and numbered elements referenced below are coupled and function similar to as described above. In addition, it is noted that stacked sensors 1100 of FIG. 11 may be an example of stacked sensor 200 of FIG. 2 or imaging system 100 of FIG. 1, and that similarly named and numbered elements referenced below are coupled and function similar to as described above.

In the depicted example, pixels 1112A-1112D are illustrated as 4T pixel implementations, each of which includes a photodiode (PD), a reset transistor (RST), a transfer transistor (TX), a source follower transistor (SF), and a row select transistor (RS) coupled to the bit line 310 as shown. It is appreciated that in other examples, other pixel implementations may also be contemplated in accordance with the teachings of the present invention. In the example, pixel 1112A is in Row 0, pixel 1112B is in Row n−1, pixel 1112C is in Row n, and pixel 1112D is in Row N of the pixel array 1102.

As shown in the depicted example, the bit line 1110 is divided or separated into a top bit line 1110A and a bottom bit line 1110B, and are electrically separated from one another in pixel wafer 1114 so the capacitance on the bottom bit line 1110B does not affect the settling time of the top bit line 1110A, and vice versa, in accordance with the teachings of the present invention. The readout circuit 1106 illustrated in FIG. 11 includes cascode device 1124, bit line switches 1122, and an analog-to-digital converter (ADC) 1120. In the depicted example, a bit line current source 1128 is coupled to the bottom bit line 110B of bit line 1110 on the bottom of pixel array 1102. Top bit line 1110A and bottom bit line 1110B are coupled to hybrid bonds 1118, which are coupled to the ADC 1110 through the bit line switches 1122 in the ASIC wafer 1116. In the depicted example, top bit line 1110A is coupled through switch "a" of bit line switches 1122 to ADC 1110, and bottom bit line 1110B is coupled through switch "b" of bit line switches 1122 to ADC.

One difference between stacked sensors 1100 of FIG. 11 and stacked sensors 500 of FIG. 5 or stacked sensors 300 of FIG. 3 is that example stacked sensors 1100 of FIG. 11 includes an additional bit line current source 1172 also coupled to the top bit line 1110A of bit line 1110 on the top of pixel array 1102 as shown. In other words, stacked sensors 1100 includes bit line current sources 1128 and 1172 coupled to both the top and bottom side of the pixel array 1102. By having the bit line current sources 1128 and 1172 on both sides of bit line 110, the difference in the bias current when reading signals through top bit line 1110A and through bottom bit line 1110B can be minimized can be minimized in accordance with the teachings of the present invention.

To read out signals from a pixel (e.g., 1112A-B) coupled to the top bit line 1110A, the switch "a" of bit line switches 1122 in FIG. 11 is turned on and the switch "b" of bit line switches 1122 is turned off so that the top bit line 1110A is coupled to the ADC 1120 and bottom bit line 1110B is not coupled to the ADC 1120. At the same time, an intermediate voltage is supplied to Vbias 1126, which causes the cascode device 1124 coupled between the top bit line 1110A and the bottom bit line 1110B through hybrid bonds 1118 to operate in the saturation region. In this way, the top bit line 1110A and the bottom bit line 1110B remain electrically separated from one another so the capacitance on the bottom bit line 1110B still does not affect the settling time of top bit line 1110A, in accordance with the teachings of the present invention.

To read out signals from a pixel (e.g., 1112C-D) coupled to the bottom bit line 1110B, the switch "a" of bit line switches 1122 in FIG. 11 is turned off and the switch "b" of bit line switches 1122 is turned on so that the bottom bit line 1110B is coupled to the ADC 1120 and top bit line 1110A is not coupled to the ADC 1120. At the same time, an intermediate voltage is supplied to Vbias 1126, which causes the cascode device 1124 coupled between the top bit line 1110A and the bottom bit line 1110B through hybrid bonds 1118 to operate in the saturation region. In this way, the top bit line 1110A and the bottom bit line 1110B remain electrically separated from one another so the capacitance on the top bit line 1110A does not affect the settling time of bottom bit line 1110B, and vice versa, in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising:
    a pixel array including a plurality of pixels, wherein each pixel is coupled to generate image data in response to incident light;
    a bit line coupled to a column of pixels of the pixel array, wherein the bit line is separated into first and second portions, wherein each one of the first and second portions of the bit line is coupled to a corresponding portion of rows of pixels of the pixel array; and
    a readout circuit coupled to the bit line to read out the image data from the pixel array, wherein the readout circuit includes a cascode device coupled between the first and second portions of the bit line, wherein the cascode device is coupled to be biased to electrically separate the first and second portions of the bit line from one another such that a capacitance of the first portion of the bit line does not affect a settling time of the second portion of the bit line and a capacitance of the second portion of the bit line does not affect a settling time of the first portion of the bit line.

2. The image sensor of claim 1, wherein the cascode device is coupled to operate in the saturation region when the readout circuit is coupled to read out the image data from the pixel array through the first portion of the bit line.

3. The image sensor of claim 2, wherein the cascode device is coupled to be turned off when the readout circuit is coupled to read out the image data from the pixel array through the second portion of the bit line.

4. The image sensor of claim 2, wherein the cascode device is coupled to operate in the saturation region when the readout circuit is coupled to read out the image data from the pixel array through the second portion of the bit line.

5. The image sensor of claim 1, wherein the readout circuit further comprises:
    a switching circuit coupled to the first and second portions of the bit line; and
    an analog-to-digital converter (ADC) coupled to the switching circuit, wherein the switching circuit is configured to couple the ADC to the first portion of the bit line when the readout circuit is coupled to read out the image data from the pixel array through the first portion of the bit line, and wherein the switching circuit is configured to couple the ADC to the second portion of the bit line when the readout circuit is coupled to read out the image data from the pixel array through the second portion of the bit line.

6. The image sensor of claim 1, further comprising a bit line current source coupled to the bit line.

7. The image sensor of claim 6, wherein the bit line current source is one of a plurality of bit line current sources coupled to the bit line, wherein the plurality of bit line current sources includes a first bit line current source coupled to the first portion of the bit line, and a second bit line current source coupled to the second portion of the bit line.

8. The image sensor of claim 6, wherein the cascode device of the readout circuit is a first cascode device, wherein bit line current source comprises:
    a second cascode device coupled to the bit line; and
    a current source device coupled second cascode device.

9. The image sensor of claim 8, further comprising a bias generator coupled to generate a first bias signal, a second bias signal, and a third bias signal, wherein the current source device is coupled to be responsive to the first bias signal, wherein the second cascode device is coupled to be responsive to the second bias signal, and wherein the first cascode device is coupled to be responsive to the third bias signal.

10. The image sensor of claim 9, wherein the bias generator is configured to generate the first bias signal to operate the current source device in the saturation region to draw a bit line bias current from the bit line.

11. The image sensor of claim 10, wherein the bias generator is configured to generate the second bias signal and third bias signal to operate the second cascode device and the first cascode device in the saturation region when the readout circuit is coupled to read out the image data from the pixel array through the first portion of the bit line.

12. The image sensor of claim 11, wherein the bias generator is configured to generate the second bias signal to operate the second cascode device in the saturation region, and generate the third bias signal to turn off the first cascode device when the readout circuit is coupled to read out the image data from the pixel array through the second portion of the bit line.

13. The image sensor of claim 11, wherein the bias generator is configured to generate the second bias signal to operate the second cascode device in the saturation region, and generate the third bias signal to operate the first cascode device in the saturation region when the readout circuit is coupled to read out the image data from the pixel array through the second portion of the bit line.

14. The image sensor of claim 12, wherein a drain voltage of the bit line current source is coupled to be determined by the second cascode device of the bit line current source so that there is no difference in the bit line bias current when the readout circuit is coupled to read out the image data from the pixel array through the first portion and when the readout circuit is coupled to read out the image data from the pixel array through the second portion of the bit line.

15. The image sensor of claim 9, wherein the bias generator is configured to generate the second bias signal to operate the second cascode device in a linear region, and third bias signal to operate the first cascode device in the saturation region when the readout circuit is coupled to read out the image data from the pixel array through the first portion of the bit line.

16. The image sensor of claim 15, wherein the bias generator is configured to generate the second bias signal to operate the second cascode device in the saturation region, and generate the third bias signal to turn off the first cascode device when the readout circuit is coupled to read out the image data from the pixel array through the second portion of the bit line.

17. The image sensor of claim 15, wherein the bias generator is configured to generate the second bias signal to operate the second cascode device in the saturation region, and generate the third bias signal to operate the first cascode device in the saturation region when the readout circuit is coupled to read out the image data from the pixel array through the second portion of the bit line.

18. The image sensor of claim 15, wherein a drain voltage of the bit line current source is coupled to be determined by the first cascode device of the readout circuit when the readout circuit is coupled to read out the image data from the pixel array through the first portion of the bit line, and wherein the drain voltage of the bit line current source is coupled to be determined by the second cascode device of the bit line current source when the readout circuit is coupled to read out the image data from the pixel array through the second portion of the bit line, and wherein there is no difference in the drain voltage of the bit line current source when the readout circuit is coupled to read out the image data from the pixel array through the first portion and when the readout circuit is coupled to read out the image data from the pixel array through the second portion of the bit line.

19. The image sensor of claim 9, wherein the pixel array and the bit line are disposed in a first wafer and wherein the readout circuit is disposed in a second wafer.

20. The image sensor of claim 19, wherein a first portion of the bias generator is disposed on the first wafer, and wherein a second portion of the bias generator is disposed on the second wafer.

21. An imaging system, comprising:
a pixel array including a plurality of pixels to generate image data in response to incident light and organized into a plurality of rows and a plurality of columns;
control circuitry coupled to the pixel array to control operation of the pixel array;
a bit line included among a plurality of bit lines coupled to the pixel array, wherein the bit line is coupled to a corresponding column of pixels of the pixel array, wherein the bit line is separated into first and second portions; and
a readout circuit included among a plurality of readout circuits coupled to the plurality of bit lines, wherein the readout circuit coupled to the bit line to read out the image data from the pixel array, wherein the readout circuit includes a cascode device coupled between the first and second portions of the bit line, wherein the cascode device is coupled to be biased to electrically separate the first and second portions of the bit line from one another such that a capacitance of the first portion of the bit line does not affect a settling time of the second portion of the bit line and a capacitance of the second portion of the bit line does not affect a settling time of the first portion of the bit line.

22. The imaging system of claim 21, wherein the cascode device is coupled to operate in a saturation region when the readout circuit is coupled to read out the image data from the pixel array through the first portion of the bit line.

23. The imaging system of claim 22, wherein the cascode device is coupled to be turned off when the readout circuit is coupled to read out the image data from the pixel array through the second portion of the bit line.

24. The imaging system of claim 22, wherein the cascode device is coupled to operate in the saturation region when the readout circuit is coupled to read out the image data from the pixel array through the second portion of the bit line.

25. The imaging system of claim 21, further comprising function logic coupled to the readout circuit to store image data read out from the pixel array.

26. The imaging system of claim 21, wherein the readout circuit further comprises:
a switching circuit coupled to the first and second portions of the bit line; and
an analog-to-digital converter (ADC) coupled to the switching circuit, wherein the switching circuit is configured to couple the ADC to the first portion of the bit line when the readout circuit is coupled to read out the image data from the pixel array through the first portion of the bit line, and wherein the switching circuit is configured to couple the ADC to the second portion of the bit line when the readout circuit is coupled to read out the image data from the pixel array through the second portion of the bit line.

27. The imaging system of claim 21, further comprising a bit line current source coupled to the bit line.

28. The imaging system of claim 27, wherein the bit line current source is one of a plurality of bit line current sources coupled to the bit line, wherein the plurality of bit line current sources includes a first bit line current source coupled to the first portion of the bit line, and a second bit line current source coupled to the second portion of the bit line.

29. The imaging system of claim 27, wherein the cascode device of the readout circuit is a first cascode device, wherein bit line current source comprises:
a second cascode device coupled to the bit line; and
a current source device coupled second cascode device.

30. The imaging system of claim 29, further comprising a bias generator coupled to generate a first bias signal, a second bias signal, and a third bias signal, wherein the current source device is coupled to be responsive to the first bias signal, wherein the second cascode device is coupled to be responsive to the second bias signal, and wherein the first cascode device is coupled to be responsive to the third bias signal.

31. The imaging system of claim 30, wherein the bias generator is configured to generate the first bias signal to operate the current source device in the saturation region to draw a bit line bias current from the bit line.

32. The imaging system of claim 31, wherein the bias generator is configured to generate the second bias signal and third bias signal to operate the second cascode device and the first cascode device in the saturation region when the readout circuit is coupled to read out the image data from the pixel array through the first portion of the bit line.

33. The imaging system of claim 32, wherein the bias generator is configured to generate the second bias signal to operate the second cascode device in the saturation region, and generate the third bias signal to turn off the first cascode device when the readout circuit is coupled to read out the image data from the pixel array through the second portion of the bit line.

34. The imaging system of claim 32, wherein the bias generator is configured to generate the second bias signal to operate the second cascode device in the saturation region, and generate the third bias signal to operate the first cascode device in the saturation region when the readout circuit is coupled to read out the image data from the pixel array through the second portion of the bit line.

35. The imaging system of claim 33, wherein a drain voltage of the bit line current source is coupled to be determined by the second cascode device of the bit line current source so that there is no difference in the bit line bias current when the readout circuit is coupled to read out the image data from the pixel array through the first portion and when the readout circuit is coupled to read out the image data from the pixel array through the second portion of the bit line.

36. The imaging system of claim 32, wherein the bias generator is configured to generate the second bias signal to operate the second cascode device in a linear region, and third bias signal to operate the first cascode device in the saturation region when the readout circuit is coupled to read out the image data from the pixel array through the first portion of the bit line.

37. The imaging system of claim 36, wherein the bias generator is configured to generate the second bias signal to operate the second cascode device in the saturation region, and generate the third bias signal to turn off the first cascode device when the readout circuit is coupled to read out the image data from the pixel array through the second portion of the bit line.

38. The imaging system of claim 36, wherein the bias generator is configured to generate the second bias signal to operate the second cascode device in the saturation region, and generate the third bias signal to operate the first cascode device in the saturation region when the readout circuit is coupled to read out the image data from the pixel array through the second portion of the bit line.

39. The imaging system of claim 37, wherein a drain voltage of the bit line current source is coupled to be determined by the first cascode device of the readout circuit when the readout circuit is coupled to read out the image data from the pixel array through the first portion of the bit line, and wherein the drain voltage of the bit line current source is coupled to be determined by the second cascode device of the bit line current source when the readout circuit is coupled to read out the image data from the pixel array through the second portion of the bit line, and wherein there is no difference in the drain voltage of the bit line current source when the readout circuit is coupled to read out the image data from the pixel array through the first portion and when the readout circuit is coupled to read out the image data from the pixel array through the second portion of the bit line.

40. The imaging system of claim 30, wherein the pixel array and the bit line are disposed in a first wafer and wherein the readout circuit is disposed in a second wafer.

41. The imaging system of claim 40, wherein a first portion of the bias generator is disposed on the first wafer, and wherein a second portion of the bias generator is disposed on the second wafer.

\* \* \* \* \*

UNITED STATES PATENT AND TRADEMARK OFFICE
CERTIFICATE OF CORRECTION

PATENT NO. : 10,819,936 B2
APPLICATION NO. : 16/275092
DATED : October 27, 2020
INVENTOR(S) : H. Ebihara et al.

It is certified that error appears in the above-identified patent and that said Letters Patent is hereby corrected as shown below:

In the Claims

| Column | Line | |
|---|---|---|
| 16 | 24 | Claim 8, change "coupled second" to -- coupled to the second --. |
| 18 | 42 | Claim 29, change "coupled second" to -- coupled to the second --. |

Signed and Sealed this
Eleventh Day of July, 2023

Katherine Kelly Vidal
*Director of the United States Patent and Trademark Office*